US006517039B1

(12) United States Patent
Arisaka

(10) Patent No.: US 6,517,039 B1
(45) Date of Patent: Feb. 11, 2003

(54) FIXING CLIP FOR FIXING ARTICLES ONTO PANEL AND INTERIOR MODULE WITH FIXING CLIP

(75) Inventor: Oomi Arisaka, Yokohama (JP)

(73) Assignee: Piolax, Inc., Kanagawa-Ken (JP)

( * ) Notice: Subject to any disclaimer, the term of this patent is extended or adjusted under 35 U.S.C. 154(b) by 0 days.

(21) Appl. No.: 09/587,497

(22) Filed: Jun. 2, 2000

(30) Foreign Application Priority Data

Jun. 4, 1999 (JP) ............................................ 11-157774
Mar. 29, 2000 (JP) ...................................... 2000-092302

(51) Int. Cl.[7] ................................................. B60J 3/02
(52) U.S. Cl. ............................ 248/231.81; 248/289.11; 296/97.13
(58) Field of Search ........................ 248/231.81, 289.11, 248/292.13, 222.12, 231.9; 296/97.9

(56) References Cited

U.S. PATENT DOCUMENTS

| 4,569,552 | A | * | 2/1986 | Marks | 296/97.13 |
| 4,729,590 | A | * | 3/1988 | Adams | 296/97 K |
| 5,031,953 | A | * | 7/1991 | Miller | 296/97.9 |
| 5,098,151 | A | * | 3/1992 | Peterson | 296/97.9 |
| 5,269,060 | A | * | 12/1993 | Dowd et al. | 296/897.2 |
| 5,314,227 | A | * | 5/1994 | Weiland et al. | 296/97.9 |
| 5,468,041 | A | * | 11/1995 | Viertal et al. | 396/97.9 |
| 5,829,817 | A | * | 11/1998 | Ge | 296/97.6 |
| 5,975,617 | A | * | 11/1999 | Jacquemin et al. | 296/97.9 |
| 6,015,126 | A | * | 1/2000 | Murdock | 246/214 |
| 6,021,986 | A | * | 2/2000 | Murdock | 248/224.8 |

FOREIGN PATENT DOCUMENTS

| DE | 3820334 C1 | * | 12/1989 |
| DE | 4341093 A1 | * | 6/1994 |
| FR | 2782954 A1 | * | 3/2000 |
| JP | 7069054 | | 3/1995 |
| JP | 09020137 A | * | 1/1997 |
| JP | 2000092302 | | 3/1999 |
| JP | 11157774 | | 6/1999 |
| JP | 2000314410 A | * | 11/2000 |

* cited by examiner

Primary Examiner—Ramon O. Ramirez
Assistant Examiner—Jon Szumny
(74) Attorney, Agent, or Firm—Howard & Howard

(57) ABSTRACT

A fixing clip holds the shaft of an article, and fixes the article onto a panel via a through-hole formed in the panel and having a front edge and a rear edge. The fixing clip includes a base having a front end, a rear end, and an opening, and a shaft holder formed on the base and for receiving the shaft of the article. The shaft holder has a conical wall. The fixing clip also has a first stopper that is a portion of the area on the conical wall of the shaft holder and faces the front end of the base; and a second stopper positioned along one side of the opening and facing the rear end of the base. When the fixing clip is attached to the panel, the first stopper comes into frictional contact with the front edge of the through-hole, and the second stopper catches the rear edge of the through-hole. The fixing clip also has a tail-like third stopper, which extends from the conical wall of the shaft holder above the first stopper and toward the front end of the base. The third stopper has a crook near the end, which elastically pushes the surroundings of the through-hole.

30 Claims, 19 Drawing Sheets

FIXING CLIP FOR FIXING ARTICLES ONTO PANEL AND INTERIOR MODULE WITH FIXING CLIP

The present patent application claims the benefit of earlier Japanese Patent Application Nos. H11-157774, filed on Jun. 4, 1999, and 2000-092302, filed on Mar. 29, 2000, the disclosures of which are incorporated herein by reference.

BACKGROUND OF THE INVENTION

1. Field of the Invention

This invention relates to a fixing clip for fixing an article onto walls, panels, or the like, via through-holes, in a detachable manner, and to an interior module with a fixing clip. The fixing clip is suitably used to secure a sun visor or an assist grip onto a lining or a ceiling trim of an automobile. The interior module with a fixing clip is applied to, for example, a ceiling panel or a body panel of an automobile.

2. Description of the Related Art

In general, sun visors are furnished above the front sheets of an automobile in order to protect the driver's eyes and the passenger's eyes from the sun. The sun visor is generally attached to the ceiling panel of an automobile by a fixing clip that holds one end of the shaft of the sun visor in a rotatable manner. Such a conventional fixing clip generally has a base, on which a grommet for receiving the shaft of the sun visor is monolithically formed, and stoppers for elastically supporting the base onto the body panel.

With this fixing clip, the stoppers have to be inserted into a through-hole formed in the panel in order to fix the base onto the panel. However, the stoppers generally greatly extend outward in order to support the base onto the panel via the through-hole. It is troublesome to insert the stoppers into the through-hole, and in addition, the rim of the sun visor often hits the front window or the room mirror.

Recently, several parts or accessories are temporarily fixed to a lining or a ceiling trim in advance, prior to shipping to an assembly plant. This process is so-called modularization. The modularized lining or ceiling trim is assembled into an automobile, and the parts and the accessories temporarily attached to the lining or the ceiling trim are finally fixed to the ceiling panel or the body panel of the automobile.

For example, in order to secure a ceiling module, in which sun visors are temporarily attached by fixing clips to a ceiling trim, to the ceiling panel, the elastic stoppers extending outward from the ceiling module have to be inserted into a through-hole formed in the ceiling panel again. This process is troublesome.

To overcome this problem, Japanese Patent Application Laid-open No. H7-069054 proposes a holder structure having screw grommets, as stoppers, which are monolithically formed on a base. FIG. 1A illustrates such a holder with screw grommets in a perspective view, and FIG. 1B is a cross-sectional view of the screw grommet taken along the A—A line of FIG. 1A.

The holder 10 has a base 11, a shaft holder 12 for receiving the shaft of a sun visor, and a pair of barrel-shaped half grommets 13. The half grommet 13 is formed of an elastic material, and consists of two half shells separated by a vertical groove. The shaft holder 12 and the half grommets 13 are inserted in the corresponding through-holes 18 formed in advance in an interior panel 16. Since the half grommets 13 are barrel-shaped with their upper portions tapered, they are easily inserted into the associated through-holes 18. After the insertion, the half grommet 13 is stopped by the edge of the through-hole 18 at the center swelling, as shown in FIG. 1B by the solid lines. This state is a temporarily fixed state.

To finally fix the holder 10, a screw pin 15 is inserted from the bottom of the half grommet 13 between the half shells 13a, as indicated by the virtual lines in FIG. 1B. The insertion of the pin 15 causes the two elastic half shells 13a to open outward. This state is a finally fixed state.

However, this structure disclosed in H7-69054 requires multiple holes to be formed in advanced in the interior panel 16 at a precise configuration. Furthermore, since the half grommet 13 is merely swelled in the middle, it is very likely that the holder 10 comes out from the interior panel 16 by, for example, vibration during shipping or transportation because the holder is temporarily fixed to the interior panel 16 without the pin 15. In addition, it is troublesome to fix and detach the holder 10 to and from the panel 16 using a screw pin. Using the screw pin also deteriorates the appearance of the holder 10 when it is applied to the interior of an automobile.

SUMMARY OF THE INVENTION

Therefore, it is an object of the invention to overcome these problems in the prior art, and to provide a fixing clip which allows a sun visor or an assist grip to be attached to a ceiling panel or a ceiling trim of an automobile easily and reliably.

It is another object of the invention to provide a fixing clip which can be switched between a temporarily fixed state and a finally fixed state in a simply manner.

It is still another object of the invention to provide an interior module, in which one or more fixing clips are assembled into a lining in a temporarily fixed state. This interior module facilitates assembling interior components of an automobile.

In one aspect of the invention, a fixing clip fixes an article onto a panel via a through-hole formed therein. Such an article generally has a shaft, which is to be held by the fixing clip. The through-hole has a front edge and a rear edge. The fixing clip includes a base having a front end, a rear end, and an opening; a shaft holder formed on the base and for receiving the shaft of the article; and a lid connected to the rear end of the base. The shaft holder has a side wall. The fixing clip has a first stopper that is a portion of the area on the side wall of the shaft holder and that faces the front end of the base, and a second stopper positioned along one side of the opening, facing the rear end of the base. When the fixing clip is attached to the panel, the first stopper comes into frictional contact with the front edge of the through-hole, and the second stopper catches the rear edge of the through-hole.

The lid is capable of swinging between an open position, which is in a temporarily fixed state, and a closed position, which is in a finally fixed state. The lid has a projection on its inner face, and the projection is fit into the opening of the base when the lid is closed.

Preferably, the base has an arched front end and a substantially straight rear end. Preferably, the side wall of the shaft holder is a conical wall, and the first stopper is a portion of the area on the conical wall, extending horizontally along the conical wall.

The fixing clip further has a third stopper extending from the side wall of the shaft holder above the first stopper and toward the front end of the base; and a fourth stopper projecting from the side wall of the shaft holder between the first stopper and the third stopper. The third stopper is a tail-like stopper made of an elastic material and extends obliquely downward having a crook near the end. When the fixing clip is attached to the panel, the crook elastically pushes the surroundings of the through-hole.

The second stopper has a ridge facing the rear end of the base in order to catch the rear edge of the through-hole. The distance from the crook of the third stopper to the front edge of the through-hole is set greater than the distance from the top of the ridge of the second stopper to the rear edge of the through-hole. This arrangement allows the entire weight of the article, such as a sun visor or an assist grip, to be reliably supported.

With the lid open in the temporarily fixed state, the first through fourth stoppers catch the periphery of the through-hole. Accordingly, the fixing clip is reliably attached to the panel even in the temporarily state.

The fixing clip further has a pair of fifth stoppers, positioned along two opposing sides of the opening. The projection of the lid has a pair of pushing pieces on the top. When the lid is closed, the projection is fit into the opening of the base, and pushes the rear face of the fifth stoppers outward. This arrangement enhances the engagement between the fifth stoppers and the edges of the through-hole, and ensures the finally fixed state.

In the second aspect of the invention, an interior module, in which a lining and fixing clips are assembled together, is provided. The interior module comprises a lining having one or more through-holes, each through-hole having a front edge and a rear edge; and one or more fixing clips. Each fixing clip includes a base having a front end, a rear end, and an opening; a shaft holder formed on the base and for receiving a shaft of an article. The shaft holder has, preferably, a conical wall. Each fixing clip also has at least a first stopper and a second stopper. The first stopper is a portion of the area on the conical wall of the shaft holder and in contact with the front edge of the through-hole. The second stopper is positioned facing the rear end of the base, and in contact with the rear edge of the through-hole.

The fixing clip further has a lid connected to the rear end of the base so as to be capable of swinging between an open position and a closed position. The lid has a projection on its inner face. To finally fix the interior module onto a panel, the lip is closed and the projection is fit into the opening of the base. In this state, the fixing clip is firmly engaged with the panel.

In the third aspect of the invention, a fixing clip comprises a base, an opening formed in the base, a shaft holder formed on the base and for receiving a shaft of an article, and a lid connected to the rear end of the base. The opening is shaped in an inverse-T having a neck. A first stopper projects from the side wall of the shaft holder, and extends laterally so as to face the front end of the base. The first stopper has a bottom face substantially parallel to the top face of the base and a vertical face extending from the bottom face. The lid has a projection extending from its inner face, and is capable of swinging between an open position and a closed position. A second stopper is formed on the projection. When the lid is closed, the second stopper is fit into the neck of the opening of the base. This fixing clip is attached to a panel via a through-hole formed therein. The through-hole has a front edge and a rear edge. With the lid open, the bottom face of the first stopper is in light contact with the front edge of the through-hole. When the lid is closed, the second stopper is fit into the neck of the opening, and pushes the rear edge of the through-hole, generating a reaction force. The reaction force causes the fixing clip to move toward the front edge of the through-hole. Accordingly, the bottom face and the vertical face of the first stopper come into tight contact with the front edge of the through-hole.

The fixing clip further has a pair of third stoppers standing from either side of the neck of the opening. Each of the third stoppers has a leg, an inclined piece extending obliquely downward from the top of the leg, and an elastic piece extending horizontally from the lower end of the inclined piece.

In the fourth aspect of the invention, an interior module, in which one or more fixing clips are incorporated in a lining, is provided. The interior module includes a lining having one or more through-holes, each through-hole having a front edge and a rear edge; and one or more fixing clips. Each clip comprises a base having a front end and a rear end; an opening formed in the base and shaped in an inverse-T having a neck; and a shaft holder formed on the base and for receiving a shaft of an article. The shaft holder has a side wall, which is preferably a conical wall. A first stopper projects from the side wall of the shaft holder, extending laterally. The first stopper is in contact with the front edge of the associated through-hole. A lid is connected to the rear end of the base so as to be capable of swinging between an open position and a closed position. The lid has a projection extending from its inner face. A second stopper is formed on the projection.

The fixing clips are arranged so that the lines connecting from the rear ends of the bases to the first stoppers are parallel to each other and point in the same direction. This arrangement allows the interior module to be fixed to a panel without being crinkled even when the lid is closed to finally fix the fixing clip to the panel.

BRIEF DESCRIPTION OF THE DRAWINGS

Other objects, features, and advantages of the invention will be apparent from the following detailed description in conjunction with the attached drawings, in which:

FIGS. 4A through 4D illustrates the fixing clip shown in FIG. 3, in which FIG. 4A is a top view, FIG. 4B is a front view, FIG. 4C is a right-side view, and FIG. 4D is a rear view;

FIG. 6 illustrates how the fixing clip is attached to the ceiling panel, in which

FIG. 18 illustrates examples of the through-hole formed in the ceiling panel, in which

DETAILED DESCRIPTION OF THE INVENTION

<First Embodiment>

The invention will now be described in detail in conjunction with the attached drawings.

FIGS. 2 through 7 illustrate a fixing clip according to the first embodiment of the invention. In the first embodiment, the fixing clip is applied to a sun visor holder for automobiles, which holds the shaft of a sun visor and fixes it to the ceiling panel of the automobile. A through-hole, the shape of which corresponds to the shape of the fixing clip of the first embodiment, is formed in the ceiling panel in advance.

Figure 2:
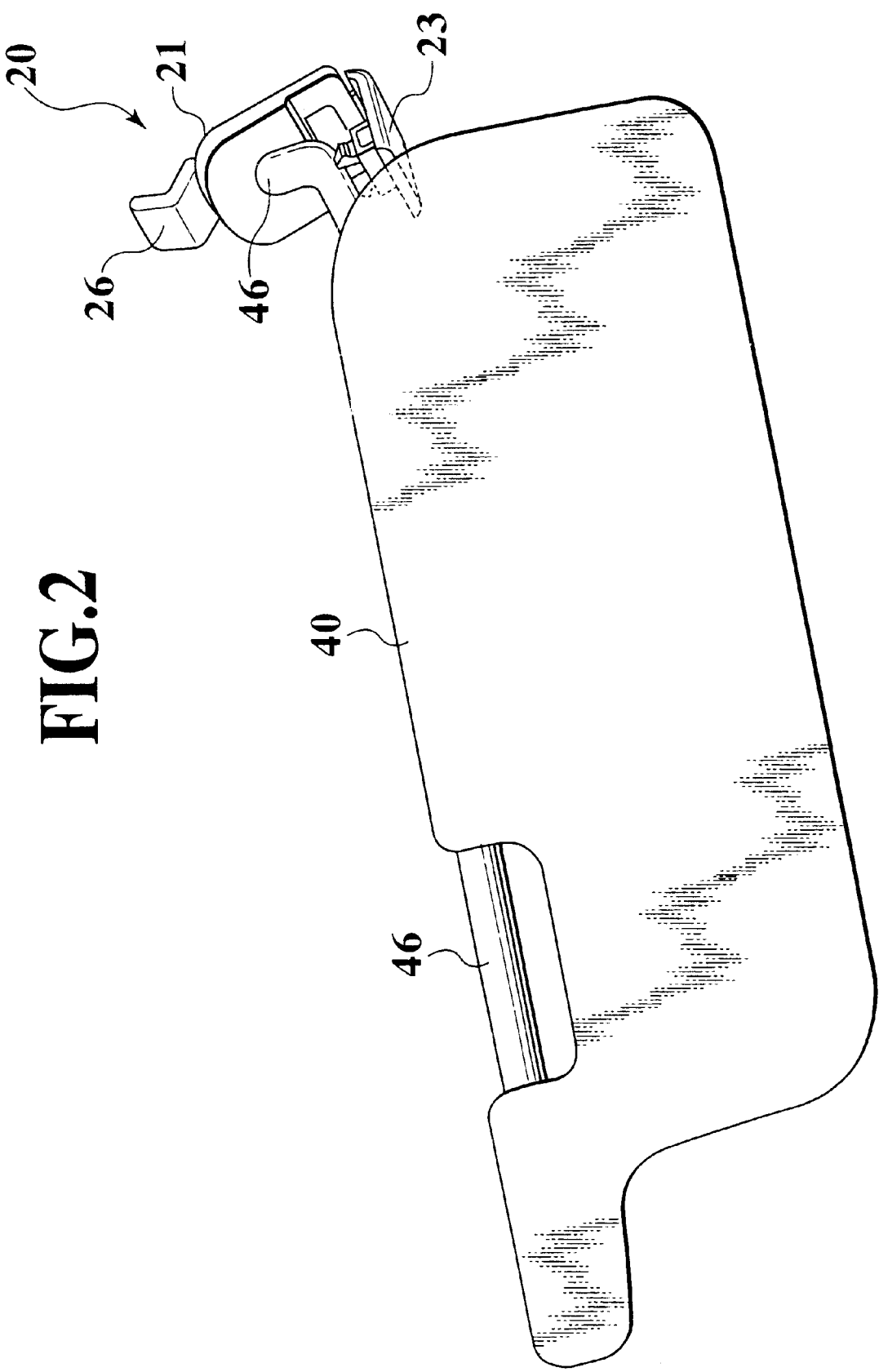
FIG. 2 illustrates a sun visor held by a fixing clip in accordance with a first embodiment of the invention.
Figure 3:
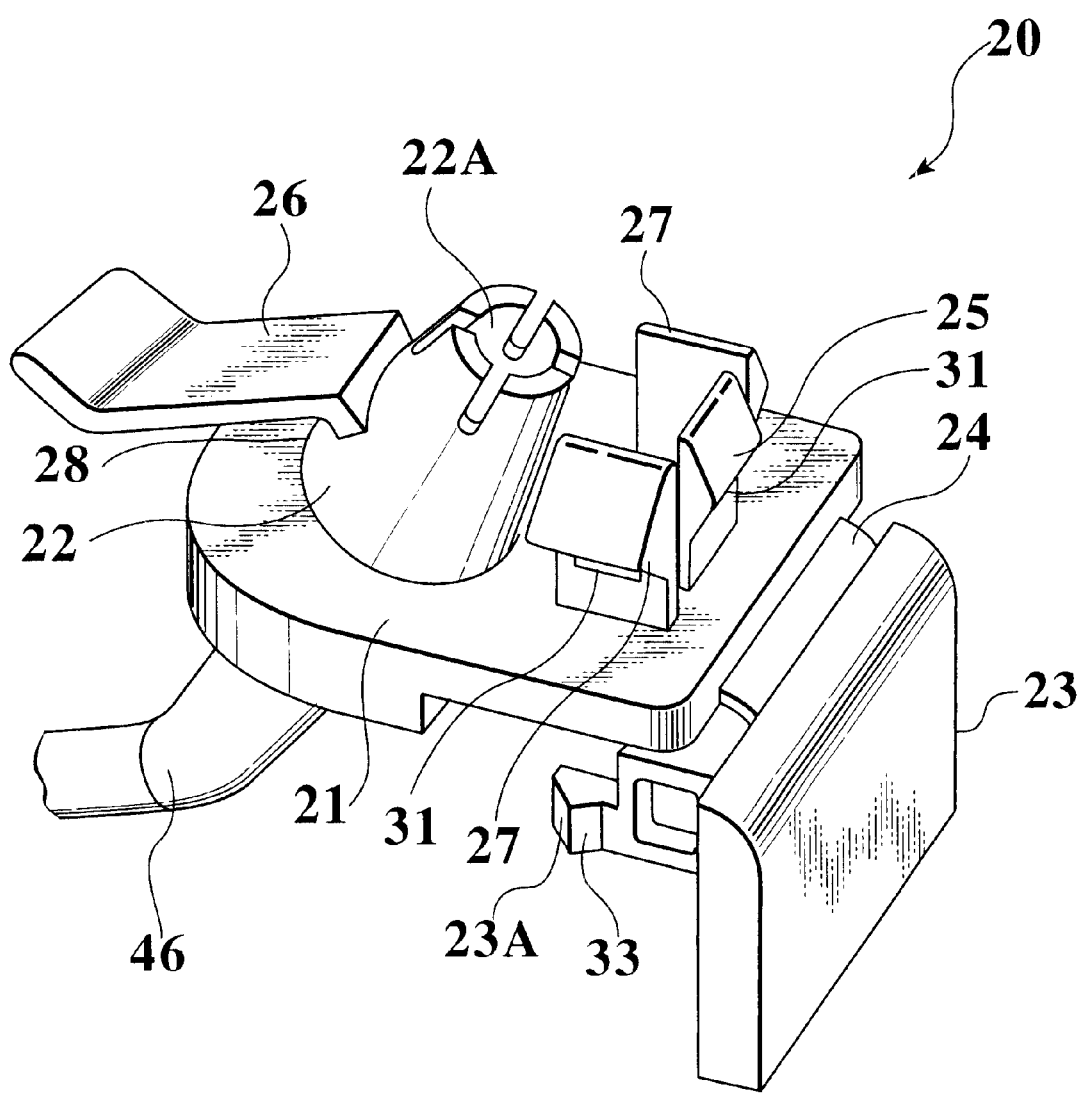
FIG. 3 illustrates in a perspective view the detailed structure of the fixing clip shown in FIG. 2.

As illustrated in FIGS. 2 through 4, the fixing clip 20 has a flat base 21, and a shaft holder 22 for receiving the shaft 46 of the sun visor 40. The base 21 has an arched front end and a substantially straight rear end. A lid 23 is connected to the rear end of the base 21 via a hinge 24 in a pivotable manner. In this embodiment, the shaft holder 22 tilts toward the hinge 24.

The through-hole P1 (see FIG. 6A) formed in the ceiling panel P is similar in figures with, but smaller in size than the base 21 of the fixing clip 20. The shaft holder 22 is a conical packing obliquely projecting from the top face of the base 21. The shaft holder 22 has a hole 22A for receiving one end of the shaft 46 of the sun visor 40. As has been mentioned above, the shaft holder 22 has a conical wall in this embodiment. A portion of the surface of the conical wall of the shaft holder 22, near the bottom and facing the front end of the base 21, functions as a first stopper 28. When the fixing clip 20 is attached to the ceiling panel via the through-hole P1, the front bottom surface of the shaft holder 22 (i.e., the first stopper) comes into frictional contact with the front edge of the through-hole P1. Under the frictional contact, the first stopper cooperates with a second stopper, the details of which will be explained below, and supports the fixing clip 20 and the sun visor 40 to the ceiling panel.

The base 21 has an opening 34 between the shaft holder 22 and the hinge 24. In the first embodiment, the opening 34 is rectangular. The lid 23 has a projection 23A in its inner face. A pair of pushing pieces 33 (FIGS. 3 and 4A) is formed on the top of the projection 23A. As the lid 23 is closed, the projection 23A is fit into the opening 34 of the base 21. The lid 23 swings about the hinge 24. The hinge can be formed monolithically together with the base 21 and the lid 23 by making the connection between the base 21 and the lid 23 very thin. As clearly shown in FIG. 4C, the top face of the base 21 is flat, while the bottom face of the base 21 is stepped. The front half (i.e., the semicircular portion) of the base 21 is thicker than the rear half (i.e., the squared portion). This is to make the bottom face of the semicircular portion of the base 21 smoothly connect with the outer surface of the lid 23 when the lid 23 is closed. This arrangement improves the appearance of the fixing clip 20 when it is finally fixed to the ceiling panel of the automobile to support the sun visor 40.

A second stopper 25 stands along one side of the opening 34 so as to face the rear end of the base 21. The second stopper 25 has a ridge 31 projecting outward. When the fixing clip 20 is attached to the ceiling panel, the ridge 31 of the second stopper 25 catches the rear edge of the through-hole P1. At this time, the front bottom surface of the shaft holder 22 functions as the first stopper 28, and is in frictional contact with the arched front edge of the through-hole P1. In this state, the first and second stoppers 28 and 25 of the fixing clip 20 are in engagement with the edges of the through-hole to support the fixing clip 20 itself.

The fixing clip 20 further has a tail-like third stopper 26 extending from the conical surface of the shaft holder 22 toward the front end of the base 21. In addition, a rib 29 extends in the lateral direction on the conical surface of the shaft holder 22 between the first stopper 28 (that is, the front bottom area of the conical surface of the shaft holder 22) and the third stopper 26. The rib 29 functions as a fourth stopper 29. A pair of fifth stoppers 27 is positioned around the opening 34 so as to be opposed to each other.

Figure 4A:
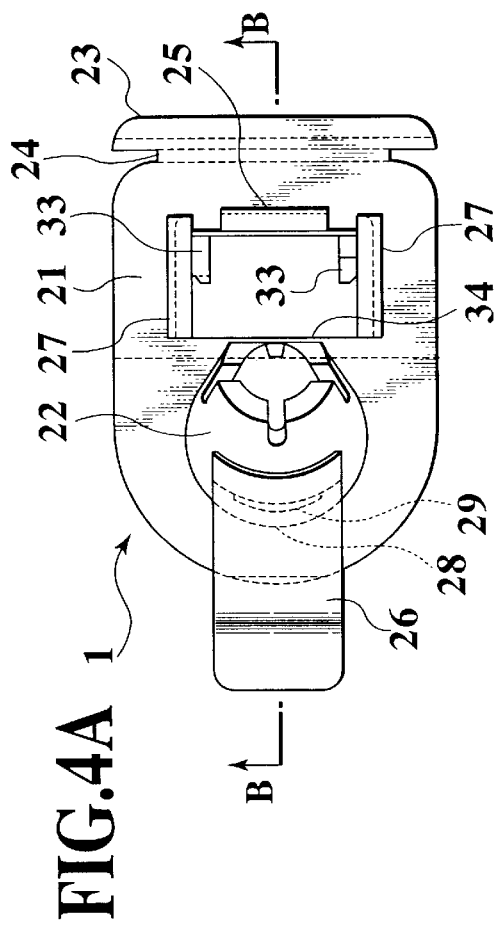
Figure 4D:
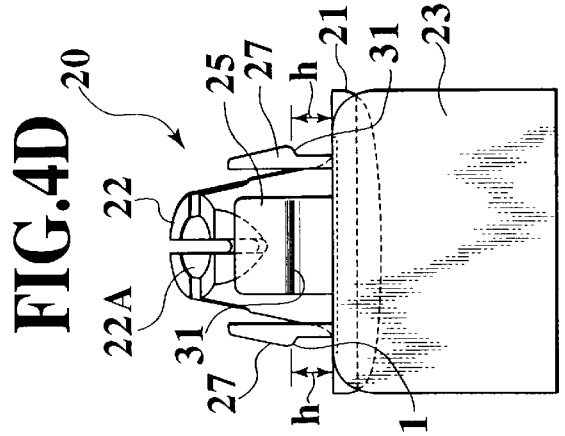
Figure 4C:
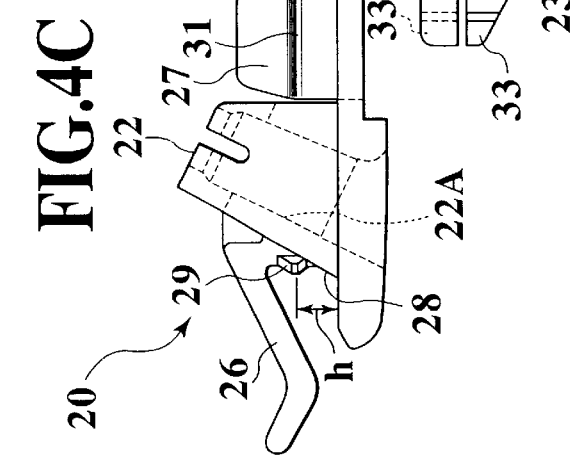
Figure 4B:
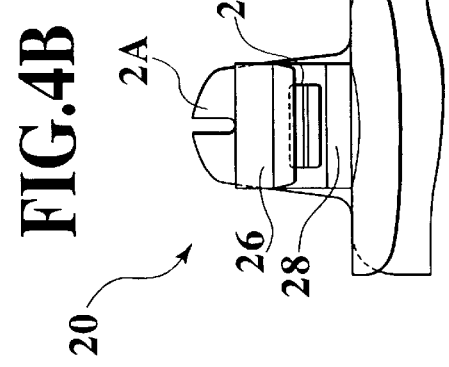

All of the first to fifth stoppers are in contact with the periphery of the through-hole P1. To be more precise, the second stopper 25 and the fifth stoppers 27 placed around the opening 34 have ridges 31 extending outward, and these ridges 31 catch the edges of the through-hole P1. The third stopper 26 is made of an elastic material, and has a crook near the end, as shown in FIG. 4C. The crook elastically presses the periphery of the through-hole P1. A distance from the crook of the third stopper 26 to the front edge of the through-hole is set greater than a distance from the top of the ridge 31 of the second stopper 25 to the rear edge of the through-hole P1. The fourth stopper (i.e., the rib) 29 reinforces the frictional contact between the first stopper 28 and the front edge of the through-hole.

Figure 5:
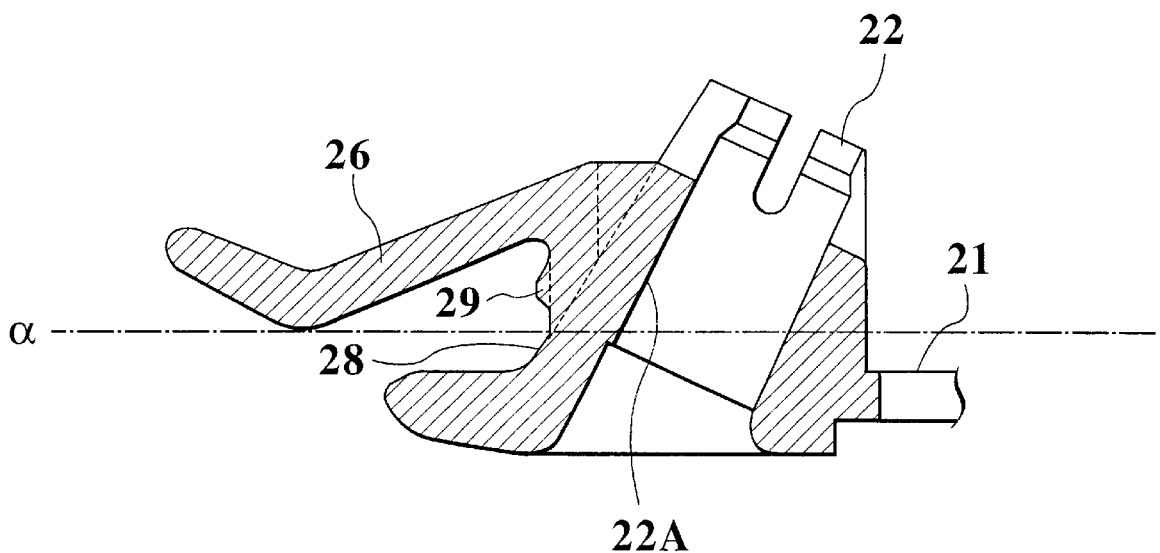
FIG. 5 is a cross-sectional view taken along the B—B line in FIG. 4A.

The rib (i.e., the fourth stopper) 29 is positioned at the same height "h" from the top face of the base 21 as the ridge 31 of the second and fifth stoppers 25 and 27. The crook of the tail-like third stopper 26 is positioned slightly lower than "h" in its home position. This state is illustrated in FIG. 5. The horizontal line α indicates the home position of the third stopper 26. The fourth stopper 29 is positioned slightly above the horizontal line α. If all of the first through fifth stoppers are inserted into the through-hole P1, the crook of the third stopper 26 is lifted up to the height "h" so as to be aligned with the second, fourth and fifth stoppers by the peripheral wall of the through-hole P1. Due to the resilience of the third stopper 26, the crook tends to return to the home position, and consequently, presses the peripheral wall of the through-hole P. This arrangement allows the fixing clip 20 and the sun visor 40 to be reliably supported to the panel.

The end portion of the shaft 46 of the sun visor 40 is inserted into the hole 22A of the shaft holder 22, as shown in FIG. 2. Since the engagement between the shaft holder 22 and the shaft 46 of the sun visor 40 has to support the entire weight of the sun visor, the engagement is significantly firm. Accordingly, it is preferable to insert the shaft 46 of the sun visor 40 into the shaft holder 22 beforehand, prior to attaching the fixing clip 20 to the panel.

Figures 6A, 6B, 6C:
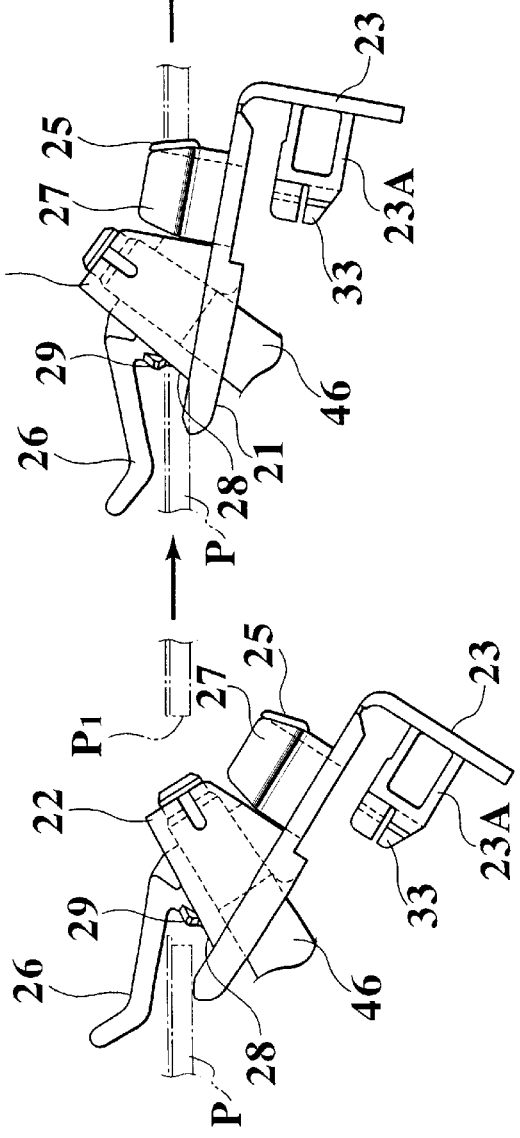
FIG. 6A shows the beginning of attaching the fixing clip.
FIG. 6B shows the fixing clip being temporarily attached.
FIG. 6C shows the finally fixed state with the lid closed.

FIG. 6 illustrates how the fixing clip 20 is attached to the ceiling panel via the through-hole P1. First, as shown in FIG. 6A, the fixing clip 20 is inclined to insert the third stopper 26, which extends over the front end of the base 21, into the through-hole P1. The the front bottom area (i.e., the first stopper 28) of the conical wall of the shaft holder 22 is brought into contact with the front edge of the through-hole P1, as shown in FIG. 6B. At the same time, the fourth stopper 29 catches the front edge of the through-hole P1. In this state, the fixing clip 20 is pivoted toward the through-hole P1 about the first and fourth stoppers 28 and 29. The second and fifth stoppers 25 and 27 having ridges 31 are elastically deformed and inserted into the through-hole P1.

In FIG. 6C, all of the first through fifth stoppers and the shaft holder 22 are completely fit into the through-hole P1. Immediately after the insertion, the lid 23 is kept open, as indicated by the virtual line. Accordingly, the fixing clip 20 is still in the temporarily fixed state. In the temporarily fixed state, the second and fifth stoppers 25 and 27 stand upright with the ridges 31 in light contact with the three edges of the through-hole P1. Furthermore, the first and fourth stoppers 28 and 29 are also in contact with the front edge of the through-hole P1. This arrangement can prevent the fixing clip 20 from moving in the longitudinal and width directions. The crook of the third stopper 26 pushes the back of the ceiling panel under the spring force, which causes the base 21 of the fixing clip 20 to be pressed against the ceiling panel. With these arrangements, the fixing clip 20 does not accidentally fall down from the through-hole hole P1 even in the temporarily fixed state.

The shaft holder 22 is positioned on the base 21 so as to be symmetrical with respect to the longitudinal center line that divides the length between the two fifth stoppers 27 into equal parts. Accordingly, if shaft holder 22 and the fifth stoppers 27 are inserted into the through-hole P1, the first stopper 28 on the conical wall of the shaft holder 22 is automatically guided to fit to the arched front edge of the through-hole P1. At the same time, the second stopper 25 positioned at the rear end of the base 21 is elastically engaged with the rear edge of the through-hole P1. In this manner, the fixing clip 20 is automatically centered to the through-hole P1 without an additional positioning process, simply by inserting the fixing clip 20 into the through-hole P1. Furthermore, a pair of fifth stoppers 27 catches the side edges of the through-hole P1 at the ridges 31 thereof, thereby preventing the fixing clip 20 from shifting in the width direction of the through-hole P1.

Figure 1A:
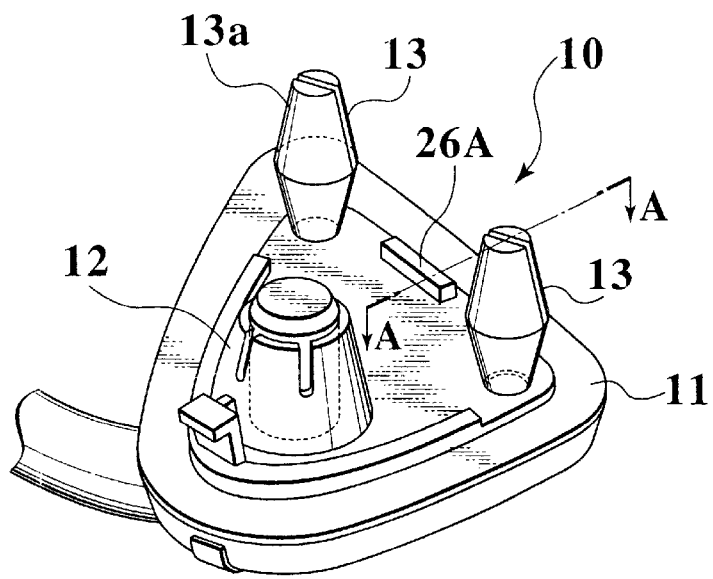
FIG. 1A illustrates a conventional fixing holder in a perspective view.
Figure 1B:
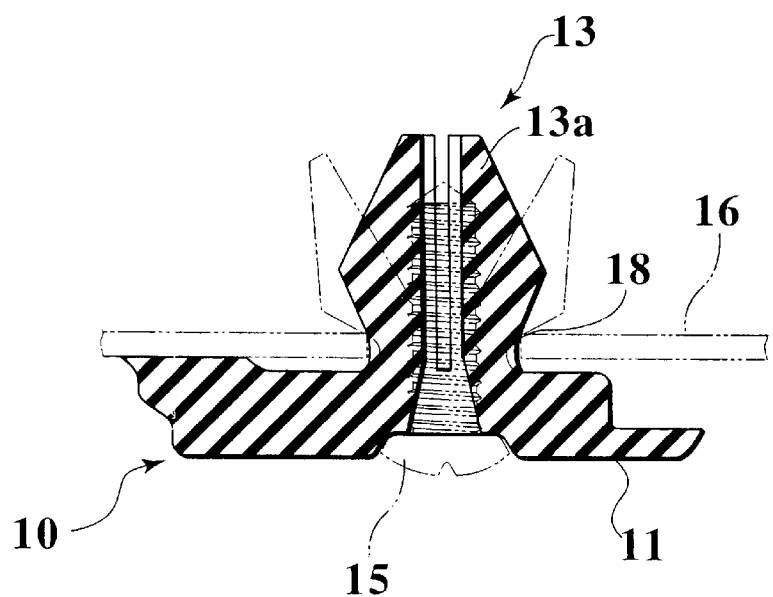
FIG. 1B is a cross-sectional view taken along the A—A line shown in FIG. 1A, in which the broken line indicates the finally fixed state of the holder, through which a screw pin is inserted.

A conventional fixing holder shown in FIG. 1 requires multiple through-holes (for example, three in the example shown in FIG. 1) to be formed in the panel in advance at a precise configuration. On the contrary, with the fixing clip 20 of the present invention, only a single through-hole P1 is formed in the ceiling panel. Accordingly, a troublesome step for forming multiple holes under a precise control of the positional relationship is eliminated, and the work efficiency can be greatly improved.

The arched front edge of the through-hole clearly exhibits the right direction of attaching the fixing clip 20.

To finally secure the fixing clip 20 onto the panel, the lid 23 is simply closed. This state is illustrated in FIG. 6C with the solid lines. As the lid 23 is closed, the projection 23A enters the opening 34 of the base 21. A pair of pressing pieces 33 is formed at the top of the projection 23A so as to be alternate. As the lid 23 is closed, a pressing piece 33 positioned closer to the hinge 24 first comes into contact with the associated fifth stopper 27, and pushes the rear face of that stopper 27. Then, the other pressing piece 33 located remote from the hinge 24 comes into contact with the other fifth stopper 27, and pushes the rear face of the fifth stopper 27 outward.

When the lid 23 is completely closed, each of the pressing pieces 33 presses the associated fifth stopper 27 outward, the ridge 31 of the fifth stopper 27 comes into tight contact with the side edge of the through-hole P1. This state is called a finally fixed state.

Figure 7:
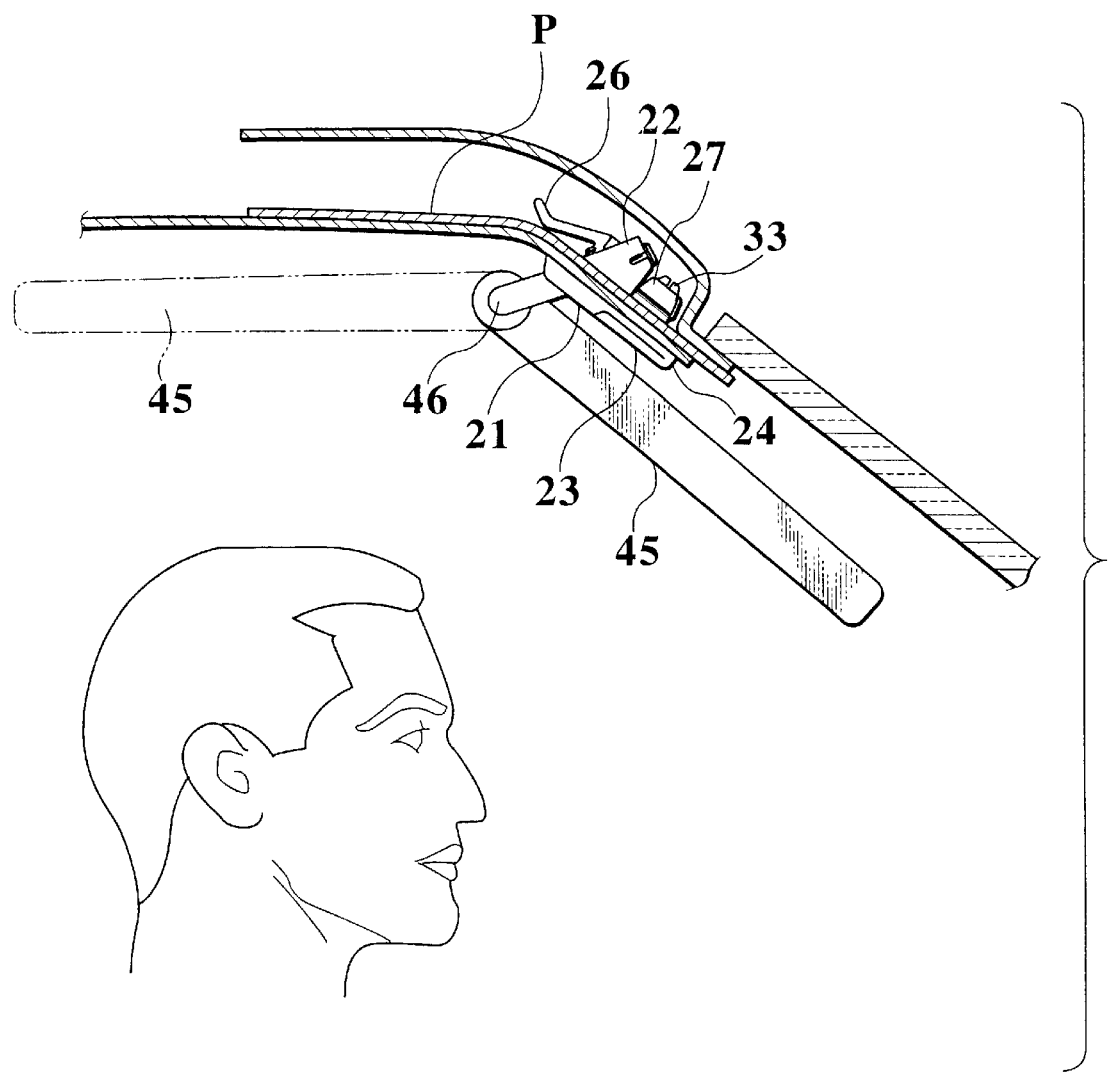
FIG. 7 illustrates the sun visor attached to the ceiling panel of an automobile using the fixing clip of the present invention.
Figure 8:
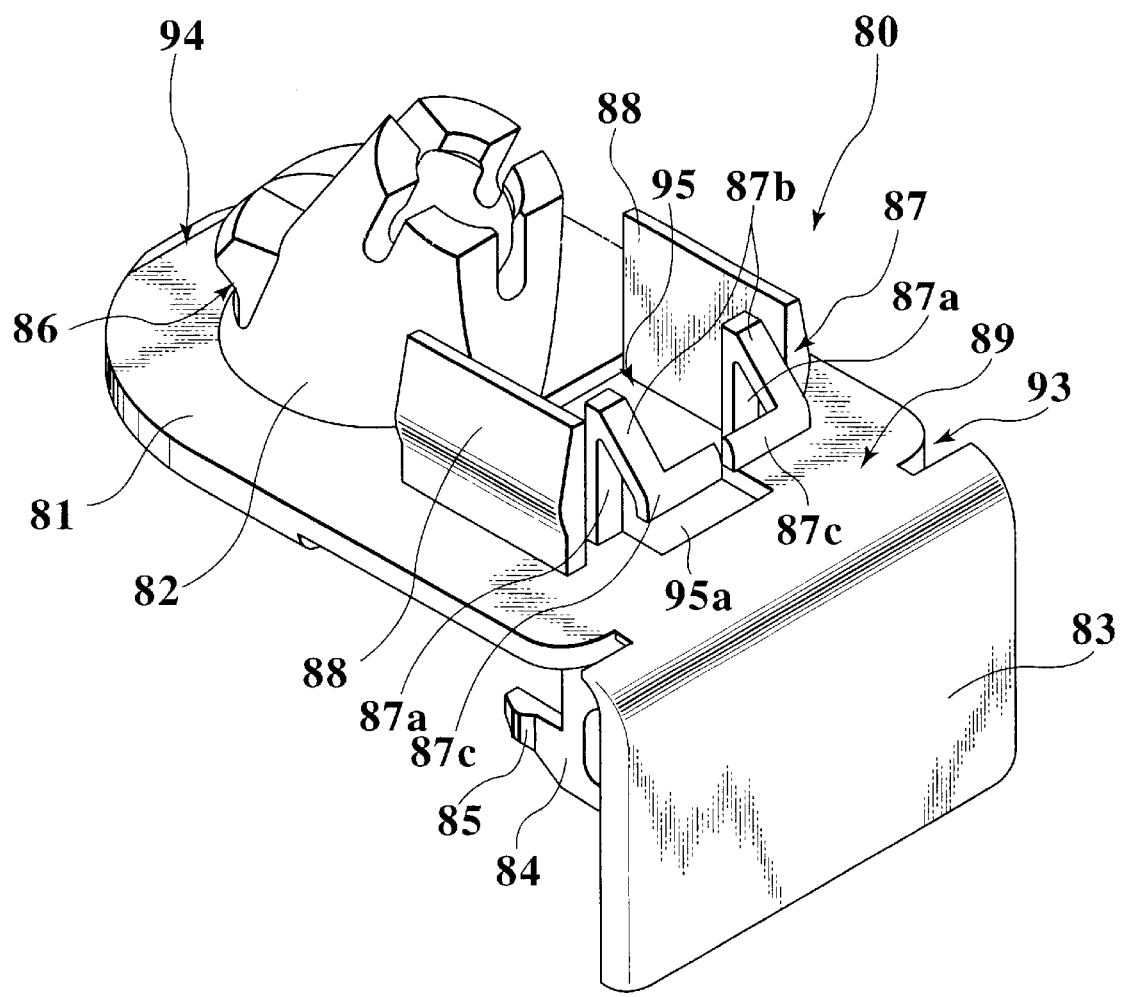
FIG. 8 illustrates in a perspective view the structure of the upper part of the fixing clip according to the second embodiment of the invention.
Figure 9:
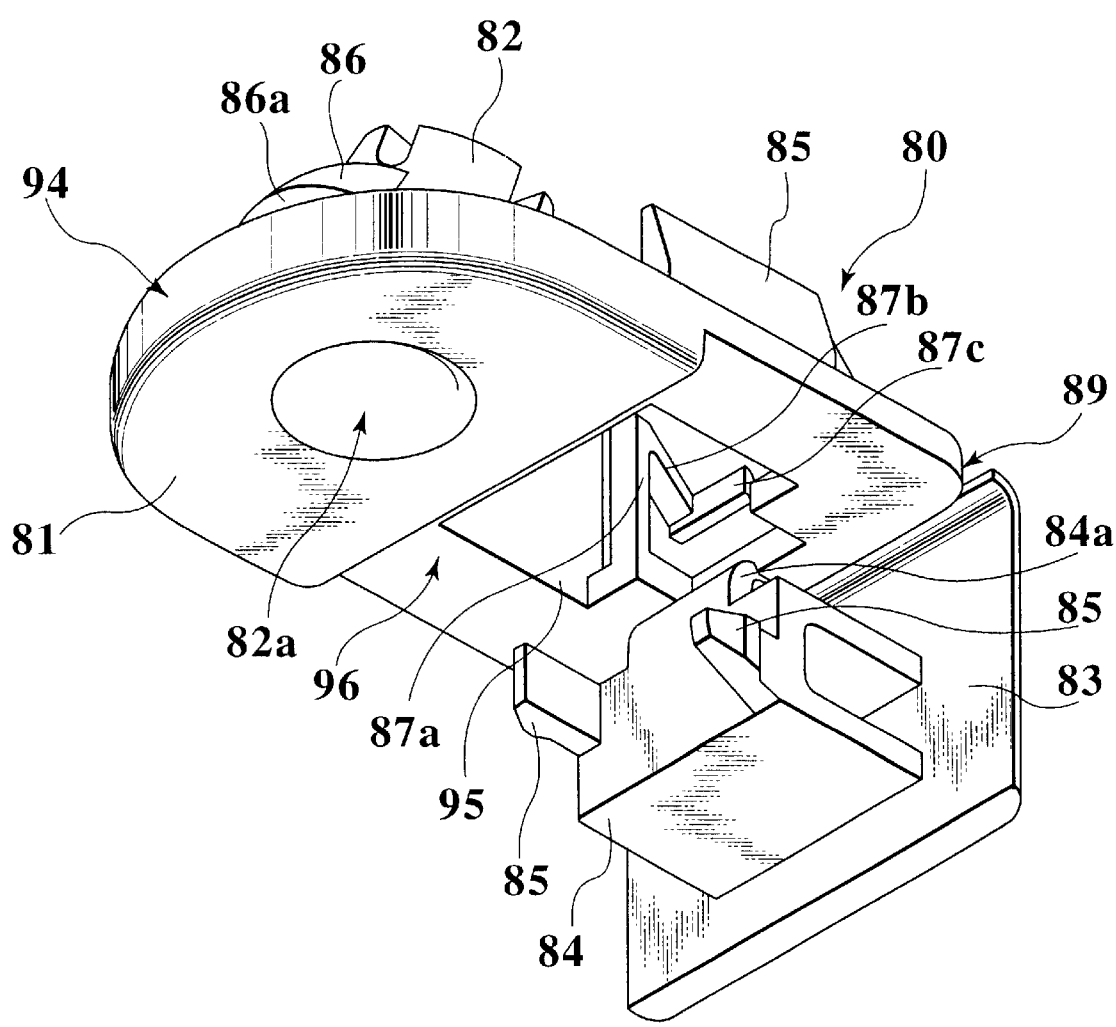
FIG. 9 illustrates in a perspective view the structure of the lower part of the fixing clip shown in FIG. 8.

In the finally fixed state, the outer surface of the lid 23 is arranged flat with the bottom surface of the base 21, and the appearance of the fixing clip 20 is improved. If the sun visor 45 is attached to the ceiling panel of an automobile using the fixing clip 20, as shown in FIG. 7, only, the slat and the smooth surface of the fixing clip 20 is observed from the driver's seat even if the sun visor 45 is pivoted upward. A recess may be formed along the front edge of the lid 23, so that the lid 23 can be easily opened when removing the fixing clip 20 from the ceiling panel. Such a recess formed at the front edge of the lid 23 will not affect the appearance of the fixing clip 20.

To remove the fixing clip 20 from the ceiling panel for purposes of maintenance or inspection of the automobile, the lid 23 is opened to take the projection 23A out of the opening 34. At this time, the projection 23A is picked between fingers and slightly twisted in order to disengage the pressing pieces 33 from the fifth stoppers 27. In the preferred embodiment, the projection 23A, the pressing pieces 33 and the first through fifth stoppers are made of an elastic material. If the projection 23A is taken out of the opening 34, the fixing clip 20 is now in the temporarily fixed state. To remove the entire fixing clip 20 from the through-hole P1 of the ceiling panel, the fixing clip 20 is pivoted about the front edge of the through-hole P1 with the first and fourth stoppers 28 and 29 as a fulcrum. The second stopper 25 and the fifth stoppers 27 are at first taken out of the through-hole P1, being elastically deformed. Then, the fixing clip 20 is pulled out into the room of the automobile, while it is tilted. In this manner, the fixing clip 20 is easily removed from the ceiling panel.

In the first embodiment, the base 21 of the fixing clip 20 and the through-hole P1 are shaped so that the front edge is arched and the rear edge is substantially straight. Accordingly, the bases of the second and fifth stoppers 25 and 27, which are positioned along the sides of the opening 34, are also formed straight, while the first and fourth stoppers 28 and 29 are arched. However, the fixing clip 20 and the through-hole are not limited to such a shape. For example, the base portion of the second stopper 25 facing to the rear end of the base 21 may be curved at a prescribed curvature. In addition, the base portion of each of the fifth stoppers 27 may be gently curved. In this case, the through-hole P1 formed in the ceiling panel is formed in a capsule shape or an oval shape. Furthermore, the shaft holder 22 is not limited to the conical shape. The shaft holder 22 may have a polygonal side face as long as the shaft of the sun visor is appropriately received by the hole.

In the first embodiment, a frictional contact between the front bottom surface of the shaft holder 22 and the front edge of the through-hole P1 is made use of to support the fixing clip 20. At the same time, the circumference of the shaft holder 22 is also utilized to achieve an automatic centering function. Furthermore, the temporarily fixed state and the finally fixed state are easily switched by simply opening or closing the lid 23. In the temporarily fixed state, the fixing clip 20 is supported mainly by the front bottom surface of the shaft holder 22, which works as the first stopper, and the second stopper 25 facing the rear end of the base 21. The third stopper 26 extending from the conical wall of the shaft holder 22, and the fourth stopper 29 extending above the first stopper reinforce the engagement between the fixing clip 20 and the through-hole P1. In the finally fixed state, the ridges 31 of the fifth stoppers 27 are pressed outward, the fixing clip 20 is more firmly engaged with the through-hole P1. In this manner, the fixing clip is supported reliably in both the temporarily and finally fixed states.

<Second Embodiment>

FIGS. 8 to 18 illustrate a fixing clip 80 in accordance with the second embodiment of the invention. In the second embodiment, a rib protruding from a side face of a shaft holder and extending in a horizontal direction is employed as a first stopper. A rectangular solid is formed on the side face of the projection extending from the inner face of the lid. This rectangular solid is used as a second stopper. An opening formed in the base is shaped in a double rectangular shape having a neck, in which a large and a small rectangle are piled up in a laterally symmetrical manner. A pair of elastic pieces stands from either side of the neck of the opening, which work as the third stoppers.

A fixing clip 80 has a flat base 81 having a shape corresponding to a through-hole 101 (FIG. 18) formed on a ceiling panel. A shaft holder 82 protrudes obliquely from the top face of the base 81. A lid 83 extends from the rear end of the base 81 via a thin hinge portion 89. An opening 95 is formed adjacent to the shaft holder 82 of the base 81. The opening 95 is double-rectangular having a neck 95*a*.

Figure 10:
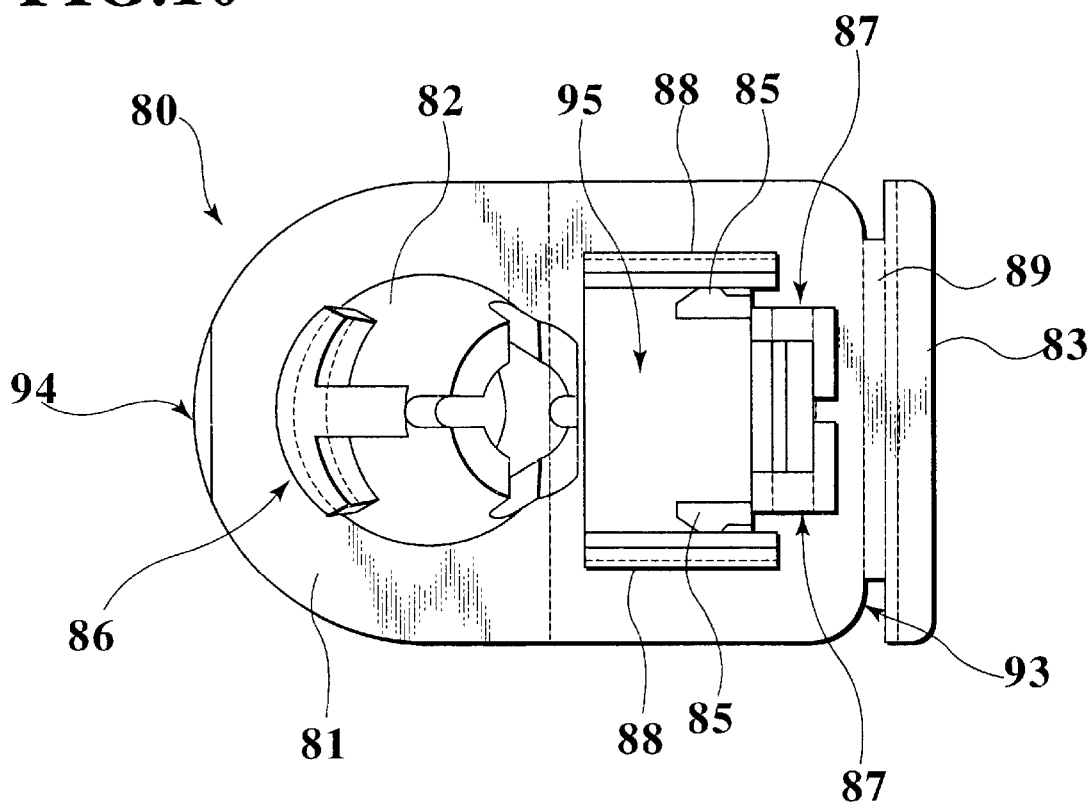
FIG. 10 is a top view of the fixing clip shown in FIG. 8.
Figure 11:
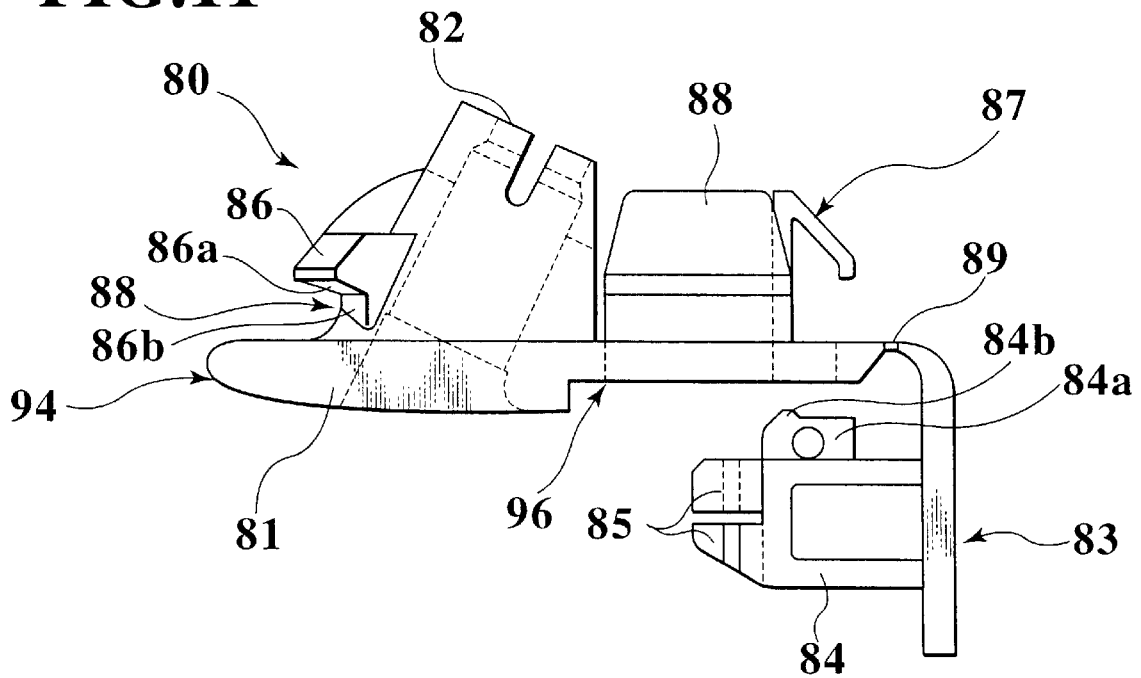
FIG. 11 is a side view of the fixing clip shown in FIG. 8.
Figure 12:
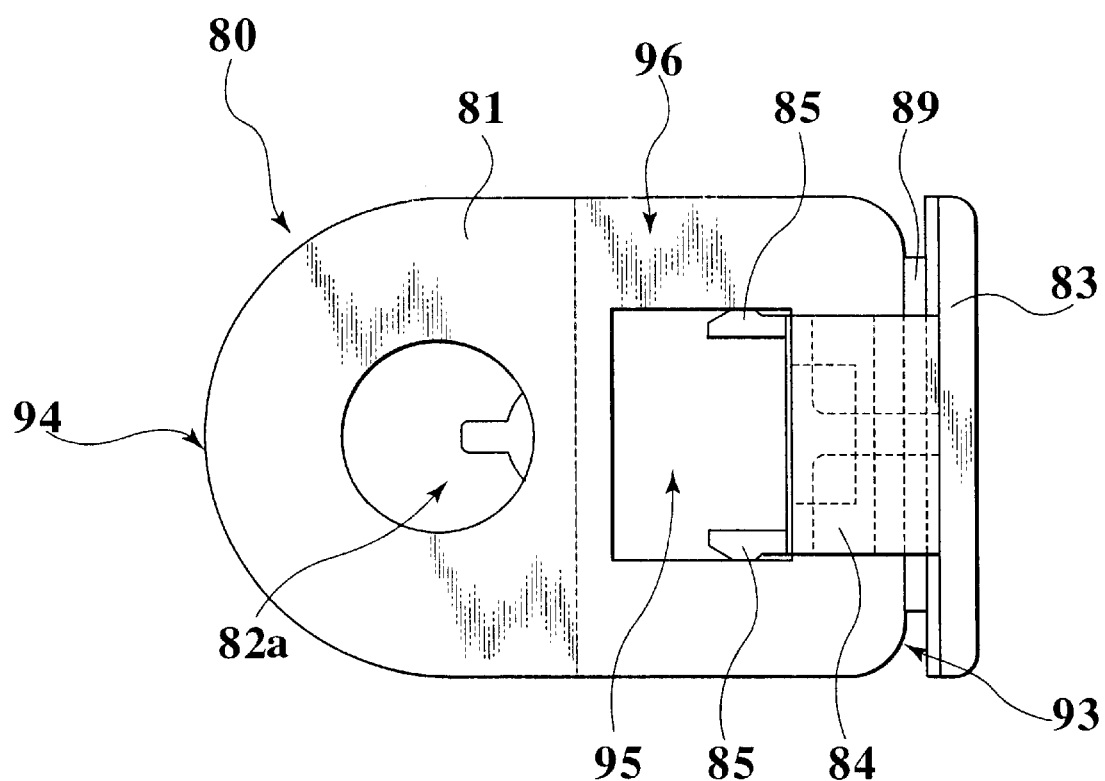
FIG. 12 is a bottom view of the fixing clip shown in FIG. 8.

As shown in FIGS. 10 and 11, the base 81 has an arched front end 94 and a straight rear end. The thickness of the front half 94 (i.e., the rounded halo) of the base 81 is set greater than that of the rear half (i.e., the squared half), as in the first embodiment. If the lid 83 is pivoted about the hinge 89 and closed, the bottom face of the base 81 and an outer surface of the lid 83 form a smooth and flat surface. This arrangement improves the appearance of the fixing clip 80 viewed from the driver's seat.

A first stopper 86 extends laterally on the side surface of the shaft holder 82 so as to face the front end 94 of the base 81. The side surface of the shaft holder 82 is conical in the second embodiment, as in the first embodiment. The first stopper 86 has a bottom face 86*a*, which is substantially parallel to the top surface of the base 81, and a vertical face 86*b*, which extends vertically downward from the bottom face 86*a*. When the fixing clip 80 is attached to the ceiling panel 100, the horizontal bottom face 86*a* of the first stopper 86 comes into contact with the periphery of the through-hole 101.

A projection 84 having a U-shaped cross-section is formed in the inner face of the lid 83. A rectangular solid 84*a* is formed on the side face of the projection 84 closest to the hinge 89. The rectangular solid 84*a* works as a second stopper. If the lid 83 is closed, the projection 84 enters the opening 95, and the second stopper (i.e., the rectangular solid) 84*a* is fit into the neck 95*a* of the opening 95. With the lid 83 completely closed, the second stopper 84*a* pushes the rear edge of the through-hole 101 of the panel 100, generating a reaction force. The reaction force causes the fixing clip 80 to shift toward the front edge of the through-hole 101. Consequently, the bottom face 86*a* and the vertical face 86*b* of the first stopper 86 come into tight contact with the front edge of the through-hole. The principle of this structure will be explained in more detail below.

A pair of third stoppers 87 stands upright from either side of the neck 95*a* of opening 95. A pair of fourth stoppers 88 are opposed to each other with the opening 95 between them. The fourth stoppers 88 are arranged so as to be substantially perpendicular to the line on which the third stoppers 87 are arranged.

Each of the third stoppers 87 has a leg 87*a*, an inclined portion 87*b* extending from the top of the leg 87*a* obliquely downward, and an elastic piece 87*c* extending from the lower end of the inclined portion 87*b* in a horizontal direction. The elastic pieces 87*c* of the third stoppers 87 extend horizontally so as to approach each other. The elastic pieces 87*c* prevent the fixing clip 80 from coming out of the through-hole 101 in the temporarily fixed state with the lid 83 open.

Figure 13A:
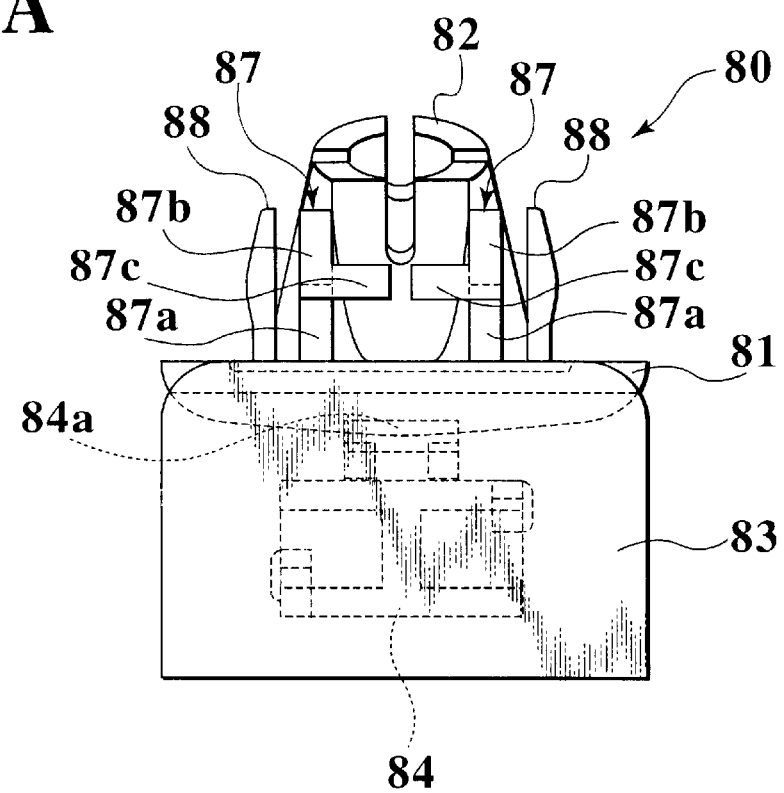
FIGS. 13A and 13B are rear and front views of the fixing clip shown in FIG. 8.
Figure 13B:
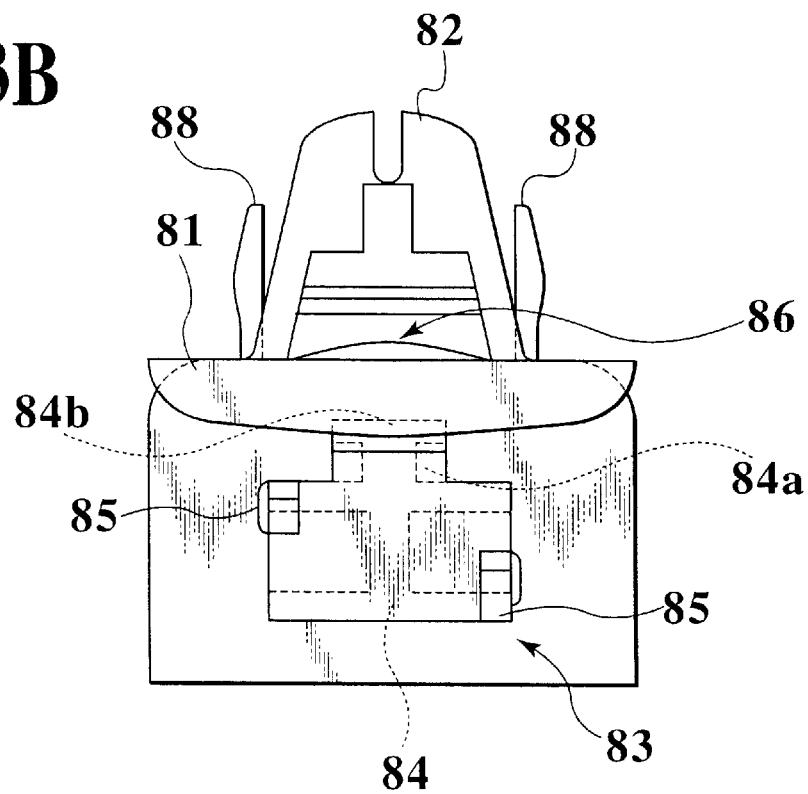

The fourth stoppers 88 are opposed to each other so as to be perpendicular to the rear end of the base 81. The outer surface of each fourth stopper 88 swells to form a ridge, as shown in FIG. 13A. The projection 84 of the lid 83 has a pair of pressing pieces 85, which are parallel to each other, but positioned alternately. As the lid 83 is closed and the projection 84 enters the opening 95, the pressing pieces 85 press the rear faces of the fourth stoppers 88 outward to bring them into tight contact with the side edges of the through-hole 101. At the same time, the second stopper 84*a* fits through the neck 95*a* of the opening 95, and pushes the rear edge of the through-hole 101, as has been mentioned above.

The fixing clip 80 may be assembled in a ceiling trim or a lining in advance in order to form a ceiling module. A process of securing such a ceiling module onto a ceiling panel of an automobile will be described with reference to FIGS. 14 through 17.

Figure 14:
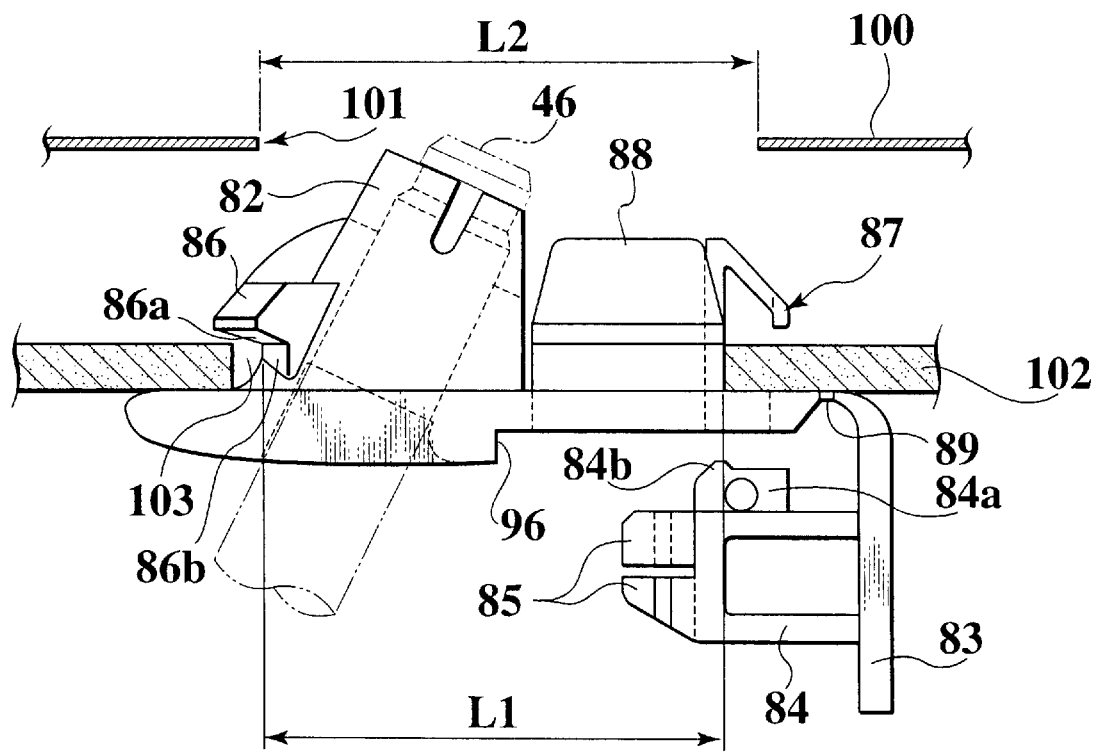
FIG. 14 is a cross sectional view of a ceiling module, in which the fixing clip of the second embodiment is assembled into a ceiling trim in the temporarily fixed state.

FIG. 14 shows a ceiling module, in which a fixing clip 80 is attached to a lining 102 in the temporarily fixed state, with the lid 83 open. The ceiling module is to be secured to the ceiling panel 100, which has a through-hole 101. The size of the through-hole 101 formed in the ceiling panel is the same as that of the through-hole 103 formed in the lining 102, and has a length L2. On the other hand, the length between the vertical face 86*b* of the first stopper 86 and the third stopper 87 of the fixing clip 80 is L1. L2 is set greater than L1 (L2>L1). The difference between L1 and L2 correspond to the thickness of the second stopper (i.e., the rectangular solid) 84*a*. Prior to securing the ceiling module to the ceiling panel, there is a gap between the vertical face 86*b* of the first stopper and the front edge of the through-hole 103 of the lining 102.

Figure 15:
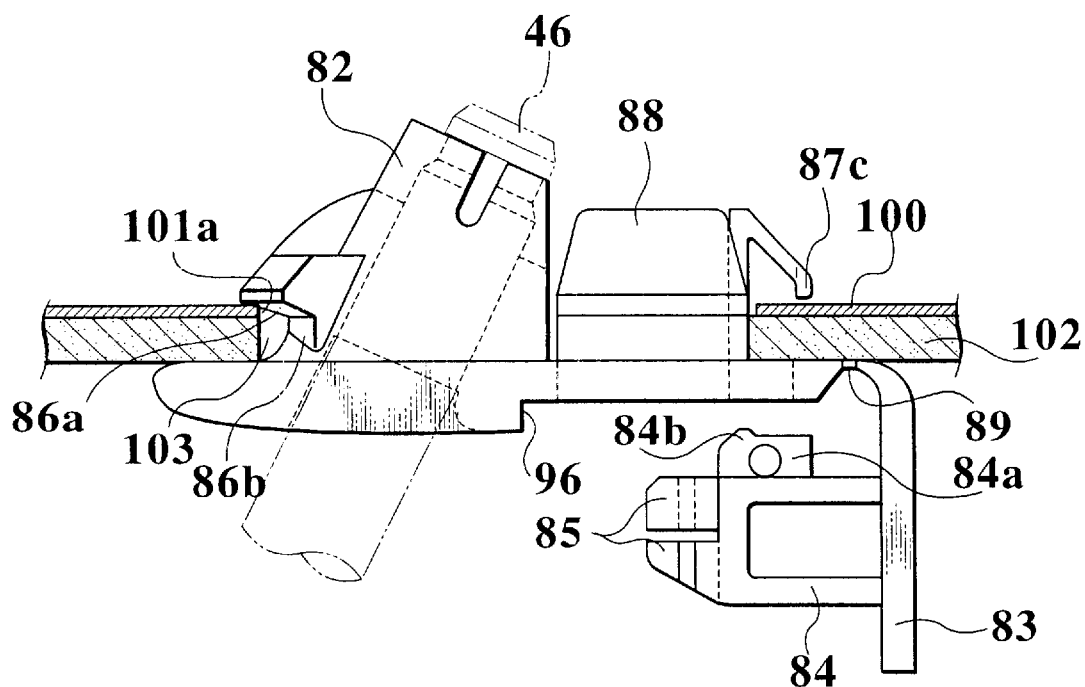
FIG. 15 illustrates in a cross sectional view the ceiling module which has just been aligned with the ceiling panel, with the fixing clip inserted into a through-hole formed in the ceiling panel.

Then, the ceiling module is lifted up to the ceiling panel 100, and the upper part of the fixing clip 80 is inserted into the through-hole 101 of the ceiling panel 100, as shown in FIG. 15. The shaft holder 82 and the first, the third, and the fourth stoppers 86, 87 and 88 are inserted to the through-hole 101. The lid 83 is still open, and the edges of the through-hole 101 of the ceiling panel 100 align with the edges of the through-hole 103 of the lining 102. The bottom face 86a of the first stopper 86 is in light contact with the front edge of the through-hole 101 of the ceiling panel. However, the gap still exists between the vertical surface 86b of the first stopper 86 and the through-hole 101.

Figure 16:
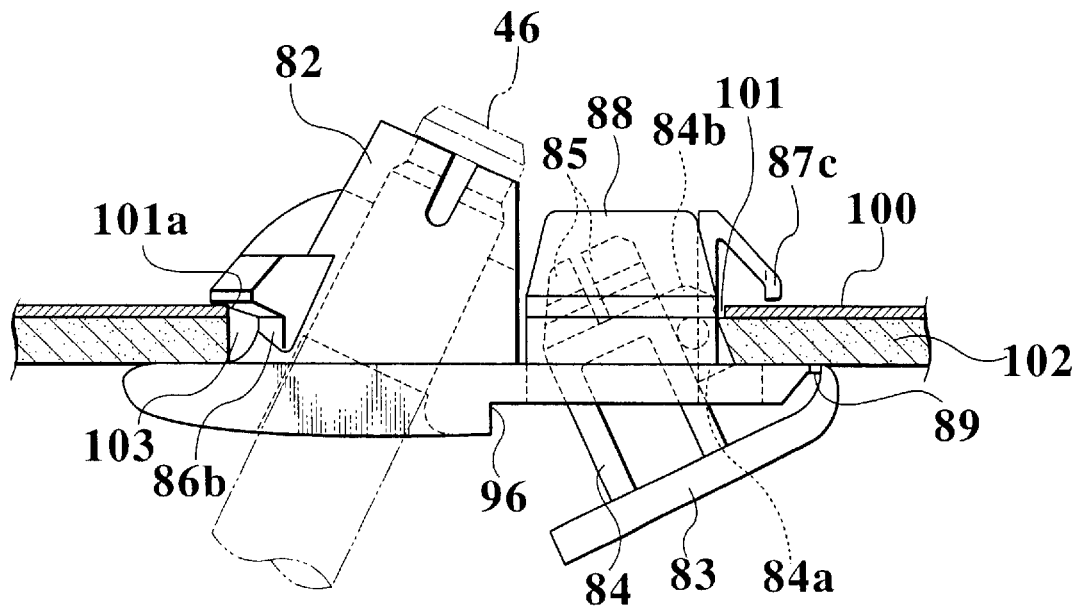
FIG. 16 illustrates in a cross sectional view the ceiling module which is in the course of being fixed to the ceiling panel by closing the lid of the fixing clip.

Then, as shown in FIG. 16, the lid 83 is rotated about the hinge 89 to close it. The projection 84 formed inside the lid 83 enters the opening 95 of the base 81. Along with the insertion of the projection 84, the second stopper 84a provided on the projection 84 is fit into the neck 95a of the opening 95, and pushes the rear edge of the through-hole 101. As a result, the entirety of the ceiling module (that is, the fixing clip 80 together with the lining 102) moves to the left in FIG. 16.

Figure 17:
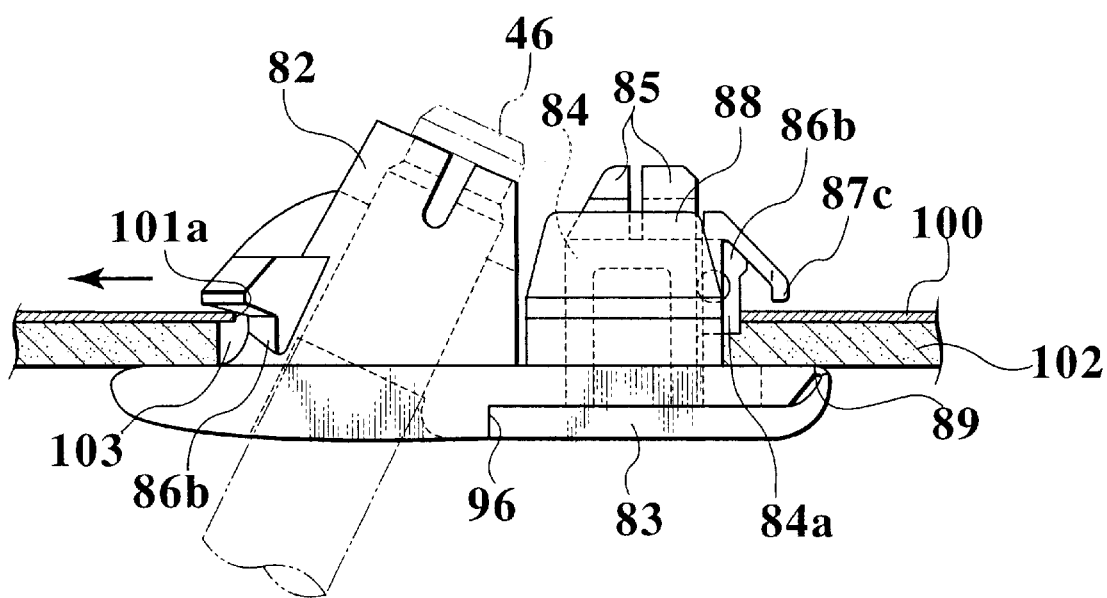
FIG. 17 illustrates in a cross sectional view the ceiling module finally fixed to the ceiling panel with the lip completely closed.

In FIG. 17, with the lid 83 closed, the fourth stopper 84a is in tight contact with the rear edge of the through-hole 101. The lower corner of the fourth stopper 84a digs into the lining 102 since the lining is made of a relatively soft material. Now the front edge of the through-hole 101 gets deep into the corner between the bottom face 86a and the vertical face 86b. Accordingly, the fixing clip 80 is tightly engaged with the through-hole 101 without vibration or shift in the longitudinal direction. Furthermore, since the pressing pieces 85 of the projection 84 push the rear face of the fourth stoppers 88 outward, they are also in tight contact with the side edges of the through-hole 101, which prevent the fixing clip 80 shifting in the width direction. The first through fourth stoppers are firmly engaged with the through-hole 101 at the entire periphery of the through-hole 101, and the ceiling module, including the fixing clip 80, is reliably secured to the ceiling panel 100.

Figure 18A:
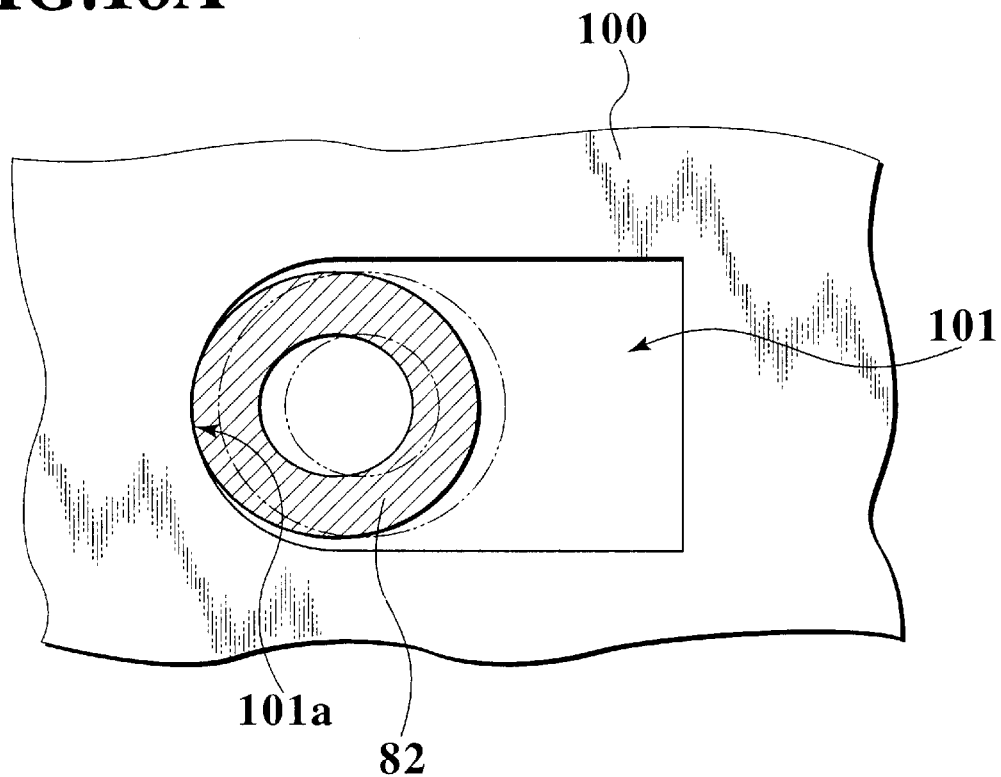
FIG. 18A shows the through-hole having an arched front edge.

FIG. 18A is a partially omitted plan view of the fixing clip 80 inserted into the through-hole 101 of the ceiling panel 100. In the second embodiment, the radius of curvature of the front edge 101a of the through-hole 101 is set substantially equal to that of the conical face of the shaft holder 82 of the fixing clip 80. When the lid. 83 is closed and the base 81 is pushed toward the front edge of the through-hole 101 due to the reaction force of the fourth stopper 84a, the shaft holder 82 is guided by the edges of the through-hole 101. As a result, the fixing clip 80 is automatically positioned in the right place, without requiring a positioning step.

Figure 18B:
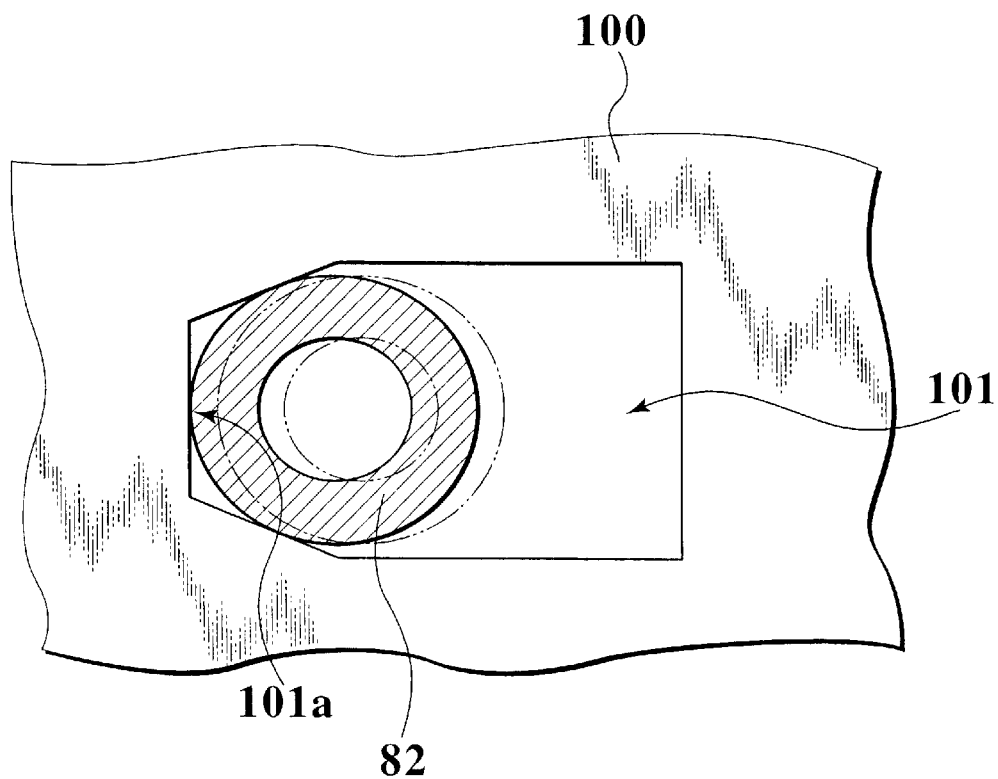
FIG. 18B shows the through-hole having a polygonal front edge.

Of course, the shape of the through-hole 101 formed on the ceiling panel 100 is not limited to the shape shown in FIG. 18A. The front edge of the through-hole may be made trapezoidal, as shown in FIG. 18B. This shape can also achieve the automatic positioning effect.

Figure 19:
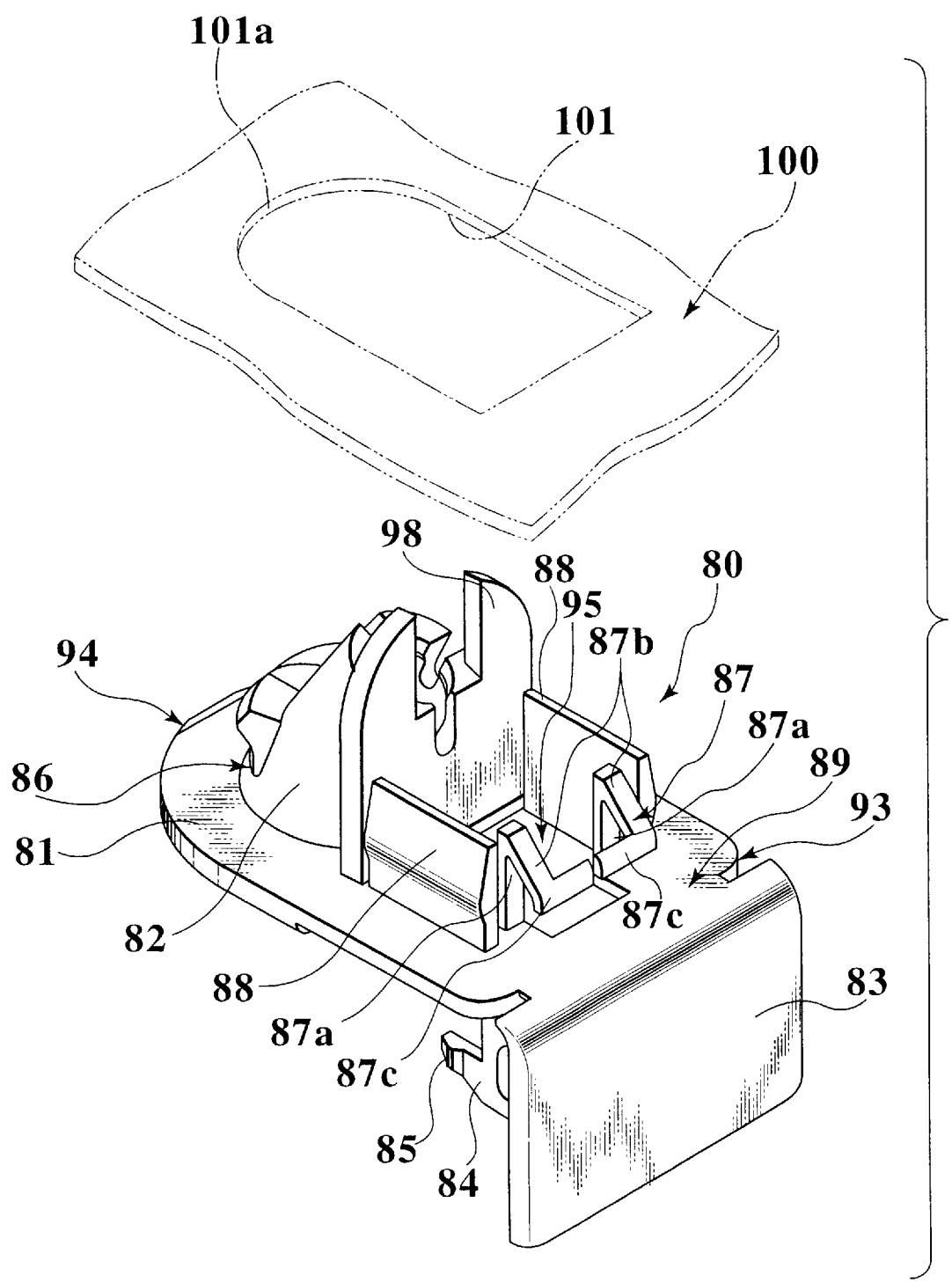
FIG. 19 illustrates in a perspective view a modification of the fixing clip of the second embodiment.

FIG. 19 illustrates a modification of the fixing clip 80. The fixing clip 80 shown in FIG. 19 has a guide rib 98 between the shaft holder 82 and the fourth stoppers 88 on the base 81. The guide rib 98 allows the fixing clip 80 to be inserted more smoothly into the through-holes 101 and 103 of the ceiling panel 100 and the lining (or the ceiling trim) 102.

Figure 20:
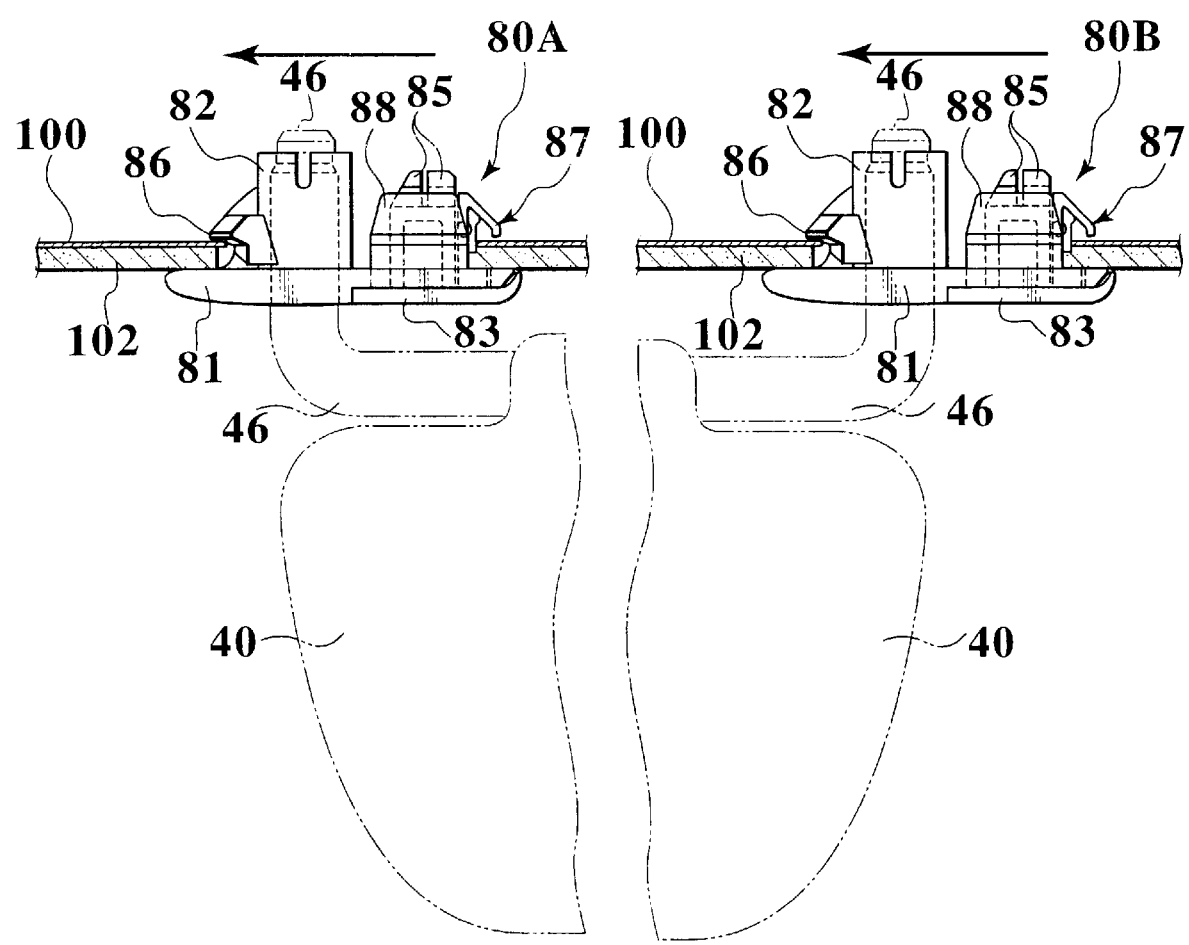
FIG. 20 illustrates in a cross-sectional view the arrangement of two fixing clips placed above the driver's seat and the passenger's seat.

FIG. 20 illustrates how the fixing clips 80 are arranged in the lining 102 above the driver's seat and the passenger's seat. If the lining or the ceiling trim 102 is formed as a single unit, consideration has to be made to the shifting direction of the fixing clip 80 in the through-hole 103. If the fixing clip 80A above the driver's seat and the fixing clip 80B above the passenger's seat move in opposite directions when they are finally fixed to the ceiling panel with the lids closed, the lining or the ceiling trim 102 is deformed or wrinkled. To avoid such an undesirable situation, the fixing clips 80A and 80B are arranged in the lining 102 so that the lines extending from the rear ends of the bases 81 toward the first stoppers 86 of the respective fixing clips are parallel to each other in the same direction. With this arrangement, the fixing clips 80A and 80B are shifted in the same direction when the lids 83 are closed. Consequently, the lining 102 keeps a good appearance even after it is finally fixed to the ceiling panel. The quality of the ceiling module is kept high.

Figure 21:
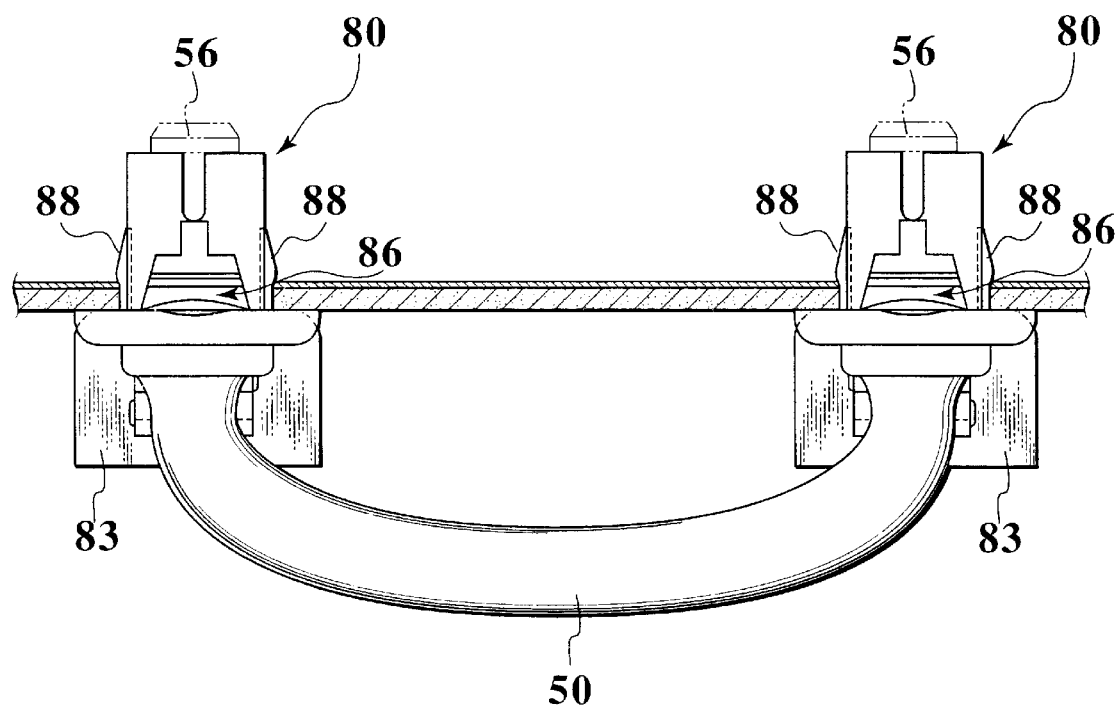
FIG. 21 illustrates an interior module which includes a ceiling trim and two fixing clips arranged in the same direction, each fixing clip holding either end of an assist grip and being in the temporarily fixed state.
Figure 22:
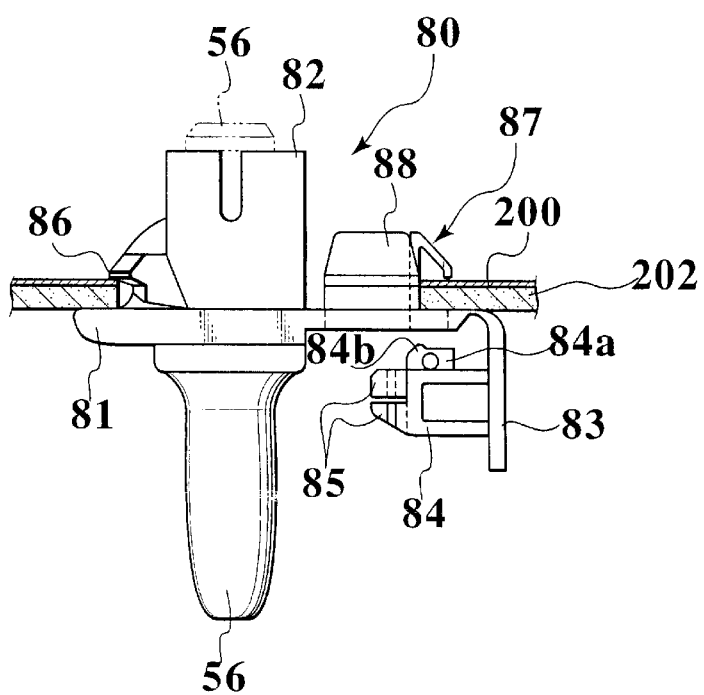
FIG. 22 illustrates the assist grip and the fixing clip of FIG. 21 in another cross-sectional view, with the fixing clip in the temporarily fixed state.

FIGS. 21 and 22 illustrates an example, in which the fixing clips of the second embodiment are applied to an assist grip 50. In this example, the shaft holder 82 of each fixing clip 80 holds a shaft 56 of the assist grip 50. The fixing clips 80 holding the assist grip 50 are secured to the lining or the ceiling trim 202 and the inner panel 200 of the body of an automobile. The assist grip 50 may be incorporated in an interior module in advance, using the fixing clips 80. In this case, the interior module is shipped with the lid of the fixing clip 80 open. To secure the interior module to the body panel 200, the lid is simply closed.

It should be noted that, besides those already mentioned above, many modifications and variations may be made without departing from the novel and advantageous features of the present invention. For example, the shaft holder may be formed in a pyramid or a hexagonal cone. The shape of the through-hole may also be varied according to the shape of the shaft holder. The fastening structure described above can be applied to many other types of holders, retainers, articles, etc. Accordingly, all such modifications and variations are intended to be included within the scope of the appended claims.

What is claimed is:

1. An interior module comprising:
   a lining having one or more through-holes, each through-hole having a front edge and a rear edge; and
   one or more fixing clips, each fixing clip comprising:
   a base having a front end, a rear end, and an opening;
   a shaft holder formed on the base and for receiving a shaft of an article, the shaft holder having a side wall;
   a first stopper that is a portion of the area on the side wall of the shaft holder and in contact with the front edge of the through-hole;
   a second stopper positioned facing the rear end of the base and being in contact with the rear edge of the through-hole;
   a lid connected to the rear end of the base so as to be capable of swinging between an open position and a closed position.

2. The interior module according to claim 1, wherein the lid has a projection on an inner face of said lid; and wherein, in order to finally fix the interior module onto a panel, the lid is closed and the projection is fit into the opening of the base.

3. A fixing clip for fixing an article having a shaft onto a panel via a through-hole formed therein, the through-hole having a front edge and a rear edge, the fixing clip comprising:
   a base having a front end and a rear end;
   an opening formed in the base, the opening being shaped in an inverse-T having a neck;
   a shaft holder formed on the base and for receiving the shaft of the article, the shaft holder having a side wall;
   a first stopper projecting from the side wall of the shaft holder and extending laterally so as to face the front end of the base, the first stopper having a bottom face substantially parallel to a top face of the base and a vertical face extending from the bottom face;
   a lid connected to the rear end of the base so as to be capable of swinging between an open position and a closed position, the lid having a projection extending from an inner face thereof, and a second stopper formed on the projection.

4. The fixing clip according to claim 3, wherein when the lid is closed, the second stopper is fit into the neck of the opening, and pushes the rear edge of the through-hole; and the bottom face and the vertical face of the first stopper come into tight contact with the front edge of the through-hole due to a reaction force.

5. The fixing clip according to claim 3, further comprising:

a pair of third stoppers standing from either side of the neck of the opening; and a pair of fourth stoppers positioned along two opposing sides of the opening so as to be perpendicular to the rear end of the base.

6. The fixing clip according to claim 5, wherein each of the third stoppers has a leg, an inclined piece extending obliquely downward from a top of the leg, and an elastic piece extending horizontally from a lower end of the inclined piece.

7. An interior module, comprising:

a lining having one or more through-holes, each of said through-holes having a front edge and a rear edge; and one or more fixing clips, each of said clips associated with a through-hole and comprising:

a base having a front end and a rear end;

an opening formed in the base, the opening being shaped in an inverse-T having a neck;

a shaft holder formed on the base and for receiving a shaft of an article, the shaft holder having a side wall;

a first stopper projecting from the side wall of the shaft holder and extending laterally and being in contact with the front edge of the associated through-hole;

a lid connected to the rear end of the base, the lid having a projection extending from an inner face of the lid and being capable of swinging between an open position and a closed position; and a second stopper formed on the projection.

8. The interior module according to claim 7, wherein said one or more fixing clips are arranged parallel to each other and in the same orientation, one of said clips in each one of said through-holes, so that a line extending from the rear end of the base to the first stopper of each clip are parallel to each other and point in the same direction.

9. The interior module according to claim 7, wherein when the interior module is finally fixed to a panel, the lid is closed; and the second stopper is fit into the neck of the opening, and pushes the rear edge of the through-hole, whereby the first stopper is brought into tight contact with the front edge of the through-hole due to a reaction force.

10. A fixing clip for fixing an article having a shaft onto a panel via a through-hole formed therein, the through-hole having a front edge and a rear edge, the fixing clip comprising:

a base having a front end, a rear end, and an opening;

a shaft holder formed on the base and for receiving the shaft of the article, the shaft holder having a side wall;

a first stopper that is a portion of an area on the side wall of the shaft holder and faces the front end of the base;

a second stopper positioned along one side of the opening, opposed to the shaft holder, and facing the rear end of the base;

a third stopper extending from the side wall of the shaft holder above the first stopper and toward the front end of the base, the third stopper having a crook near the end thereof; and a fourth stopper projecting from the side wall of the shaft holder and positioned between the first stopper and the third stopper, wherein when the fixing clip is attached to the panel, the first stopper comes into frictional contact with the front edge of the through-hole, the second stopper catches the rear edge of the through-hole, and the crook of the third stopper holds down the panel, and wherein the fourth stopper catches the front edge of the through-hole when the fixing clip is attached to the panel.

11. The fixing clip according to claim 10, wherein the third stopper is made of an elastic material, and extends obliquely from the side wall of the shaft holder toward the base, and bends at the crook away from the base.

12. The fixing clip according to claim 10, wherein the shaft holder has a conical side wall, and the first stopper is a portion of an area on the conical side wall of the shaft holder, and extends horizontally along the side wall facing the front end of the base.

13. The fixing clip according to claim 10, wherein the base has an arched front end and a substantially straight rear end.

14. The fixing clip according to claim 10, wherein the crook of the third stopper is positioned below the fourth stopper before the fixing clip is attached to the panel.

15. The fixing clip according to claim 10, wherein the second stopper has a ridge facing the rear end of the base, and the crook of the third stopper is positioned below the ridge of the second stopper before the fixing clip is attached to the panel.

16. The fixing clip according to claim 10, wherein the second stopper has a ridge facing the rear end of the base; and a distance from the crook of the third stopper to the front edge of the through-hole is set greater than a distance from a top of the ridge of the second stopper to the rear edge of the through-hole.

17. An interior module comprising:

an interior member having a through-hole;

an article attached to the interior member; and a fixing clip for attaching the article to the interior module via the through-hole, the clip comprising:

a base having an opening;

a first stopper extending from the base and being in engagement with a first edge of the through-hole;

a lid connected to the base in a pivotable manner, the lid having a projection extending from an inner face thereof; and a second stopper formed on the projection, wherein the projection is fit into the opening when the lid is closed, and the second stopper pushes the base against a second edge of the through-hole, the second edge being opposite to the first edge of the through-hole, a reactionary force causing the clip to abut against the first edge of the through-hole.

18. The interior module according to claim 17, wherein the clip further comprises a pair of stoppers standing along the opening of the base and facing each other with the opening dispersed between them.

19. The interior module according to claim 18, wherein the projection has a pair of pressing pieces, and when the projection is fit into the opening, the pressing pieces push said pair of stoppers in directions apart from each other.

20. The interior module according to claim 17, wherein said first and said second stoppers extend in a direction parallel to the reactionary force.

21. The interior module according to claim 17, wherein the first edge of the through-hole and the first stopper are arched, and when the projection is fit into the opening of the base, the first stopper is automatically centered with respect to the first edge.

22. A fixing clip for fixing an article having a shaft onto a panel via a through-hole formed therein, the through-hole having a front edge and a rear edge, the fixing clip comprising:
   a base having a front end and a rear end;
   an opening formed in the base, the opening being shaped in an inverse-T having a neck;
   a shaft holder formed on the base and for receiving the shaft of the article, the shaft holder having a side wall;
   a first stopper projecting from the side wall of the shaft holder and extending laterally so as to face the front end of the base, the first stopper having a bottom face substantially parallel to a top face of the base and a vertical face extending from the bottom face;
   a lid movable between an open position and a closed position, the lid having a projection extending from an inner face thereof, and
   a second stopper formed on the projection.

23. The fixing clip according to claim 22, wherein when the fixing clip is attached to the panel and the lid is closed, the second stopper is received into the neck of the opening, and pushes against the rear edge of the through-hole generating a reaction force; and
   the bottom face and the vertical face of the first stopper come into tight contact with the front edge of the through-hole due to the reaction force.

24. The fixing clip according to claim 22, further comprising:
   a pair of third stoppers extending upwardly from the top face of the base, each of the third stoppers positioned on each side of the neck of the opening; and
   a fourth stopper positioned at each of opposing sides of the opening such that the fourth stoppers are substantially parallel one to the other and perpendicular to a rear end of the base.

25. The fixing clip according to claim 24, wherein each of the third stoppers has a leg, an inclined piece extending obliquely downward from the top of the leg, and an elastic piece extending horizontally from the lower end of the inclined piece.

26. An interior module comprising:
   an interior member having a through-hole:
   an article to be attached to the interior member; and
   a fixing clip for attaching the article to the interior module via the through-hole, the clip comprising:
      a base having an opening;
      a first stopper extending from the base and being in engagement with a first edge of the through-hole;
      a lid to close the opening, the lid having a projection extending from an inner face thereof; and
      a second stopper formed on the projection; wherein:
         when the lid is closed, the projection is received into the opening and the second stopper pushes against a second edge of the through-hole opposite from the first edge thereby generating a reactionary force causing the clip to abut against the first edge of the through-hole.

27. The interior module according to claim 26, wherein the clip further comprises a fourth stopper positioned at each of opposing sides of the opening, the fourth stoppers facing each other.

28. The interior module according to claim 27, wherein the projection has a pair of pressing pieces such that when the projection is received in the opening, the pressing pieces push the fourth stoppers in directions apart one from the other.

29. The interior module according to claim 26, wherein the fourth stoppers are parallel one to the other and extend in a direction parallel to the reactionary force.

30. The interior module according to claim 26, wherein the first edge of the through-hole and the first stopper are arched such that when the projection is fit into the opening of the base, the first stopper is automatically centered with respect to the first edge.

* * * * *